Figure 1:
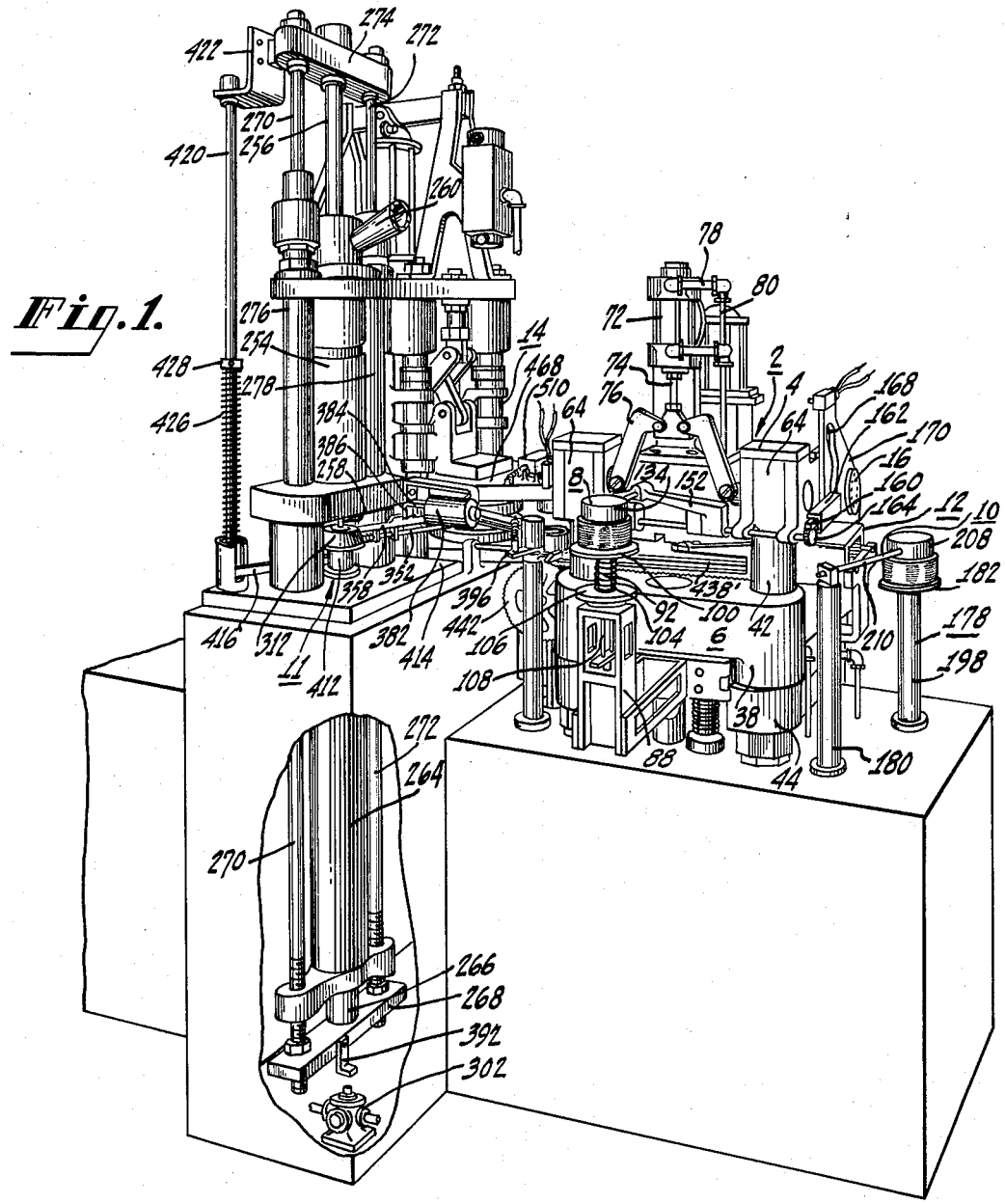

May 1, 1956 L. C. HARLOW ET AL 2,743,478
AUTOMATIC MOLDING APPARATUS
Filed Oct. 31, 1951 17 Sheets-Sheet 1

INVENTORS
LORAINE C. HARLOW AND
QUINCY E. SMITH
BY Morris Rabkin
ATTORNEY

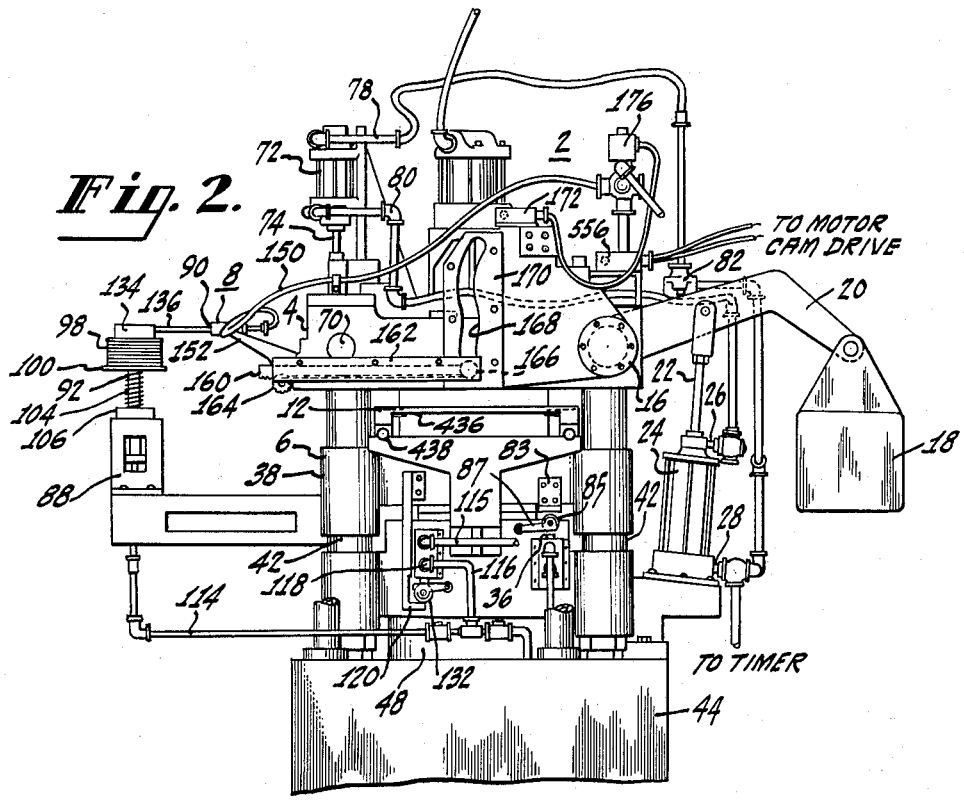
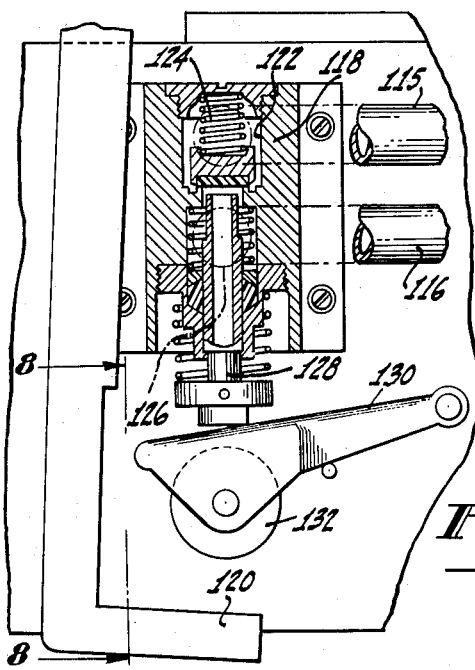
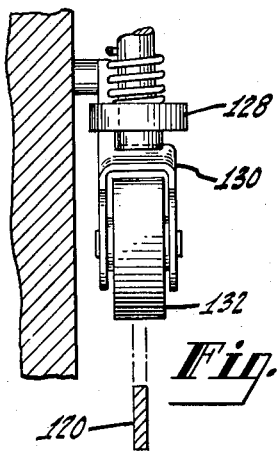

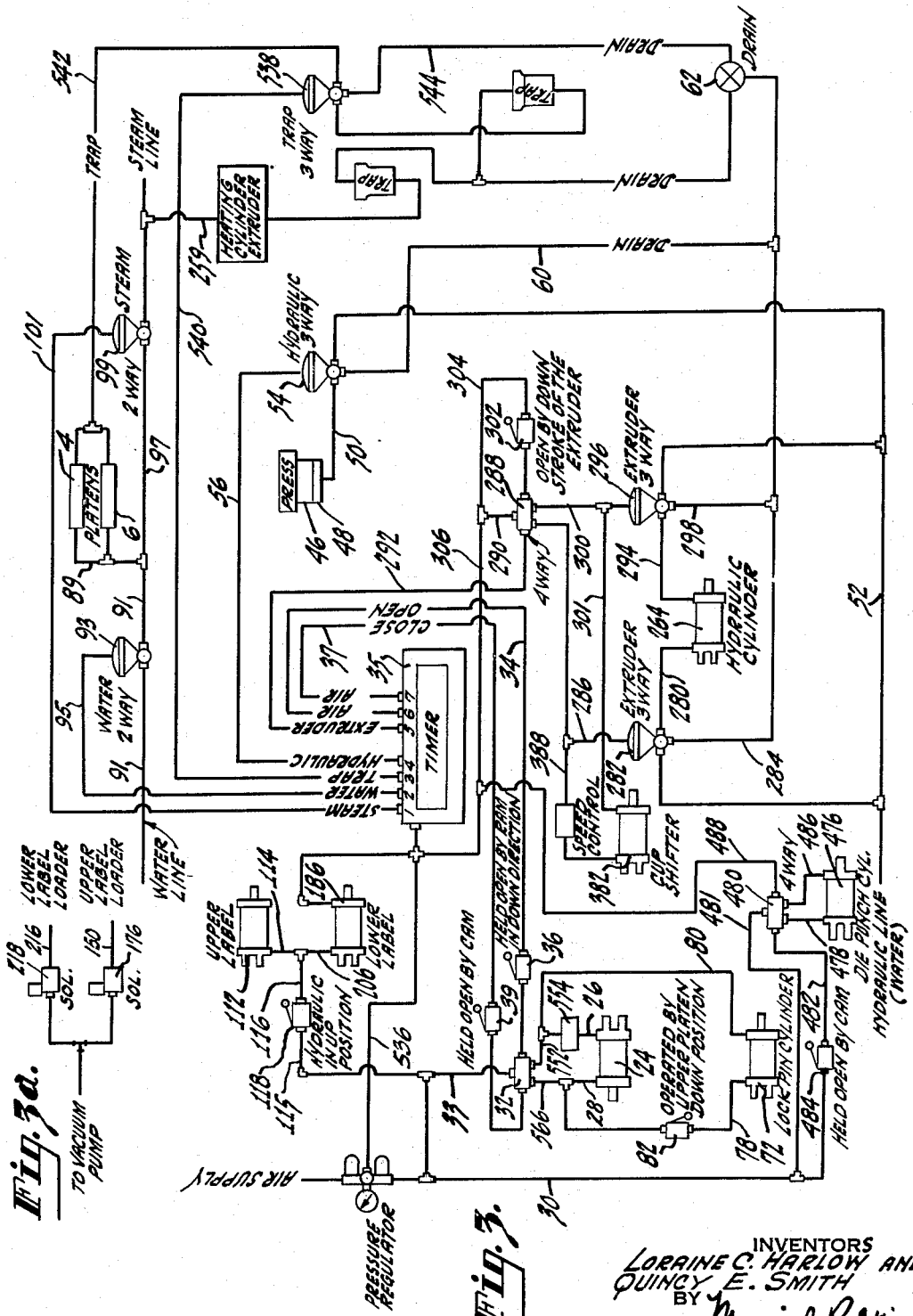

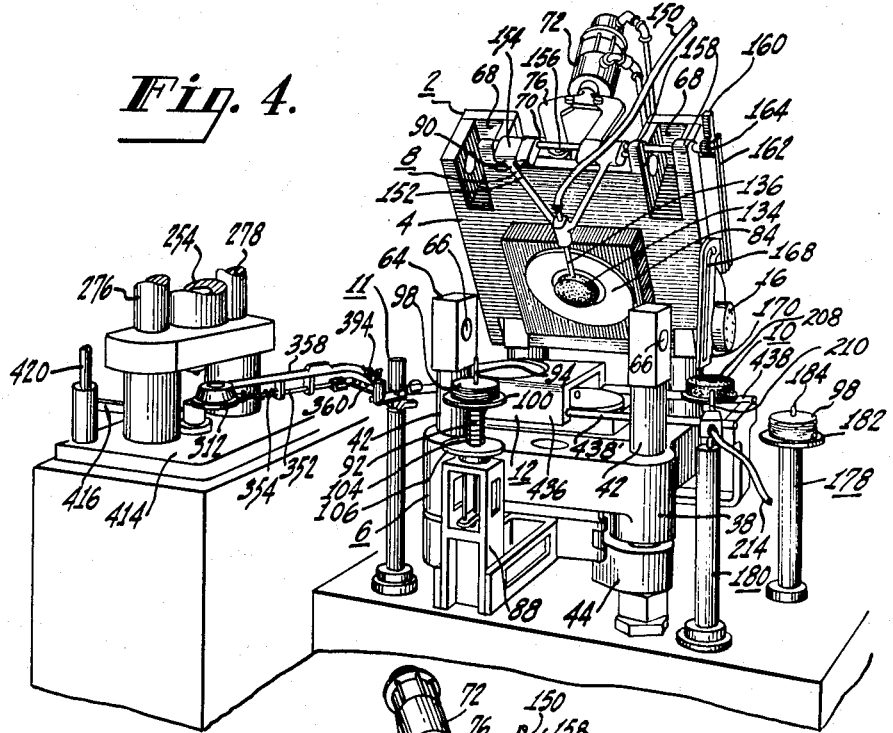
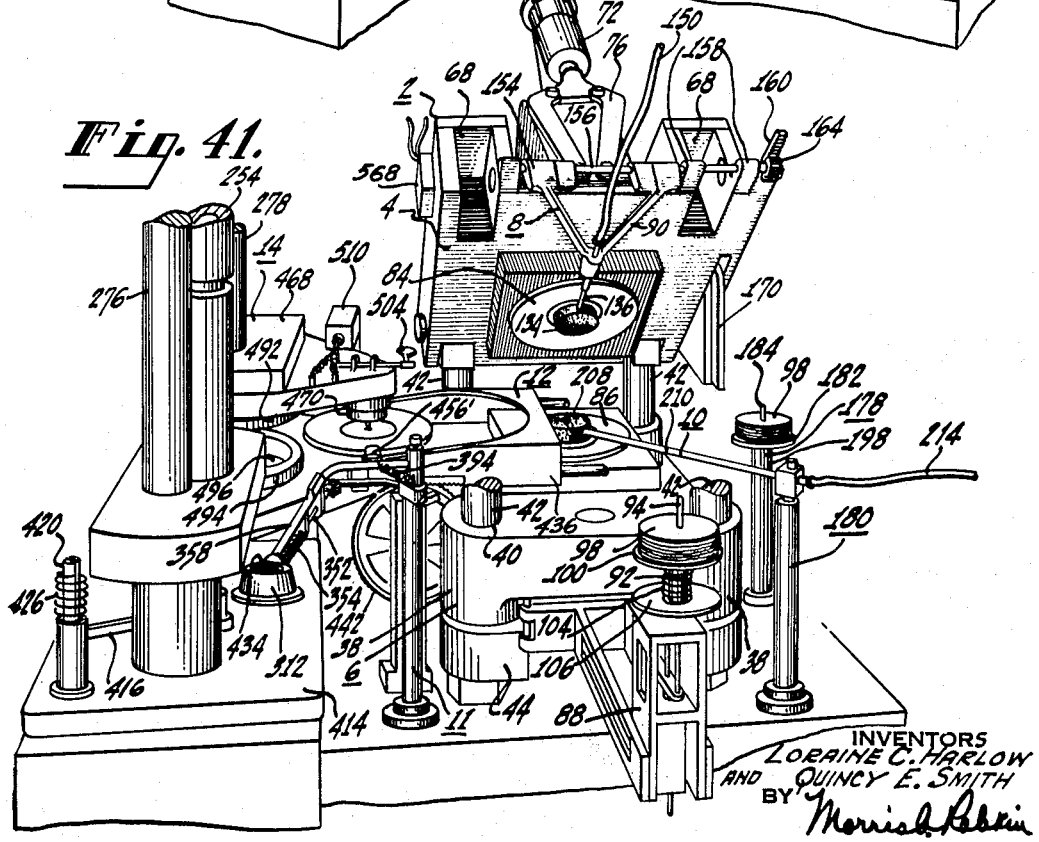

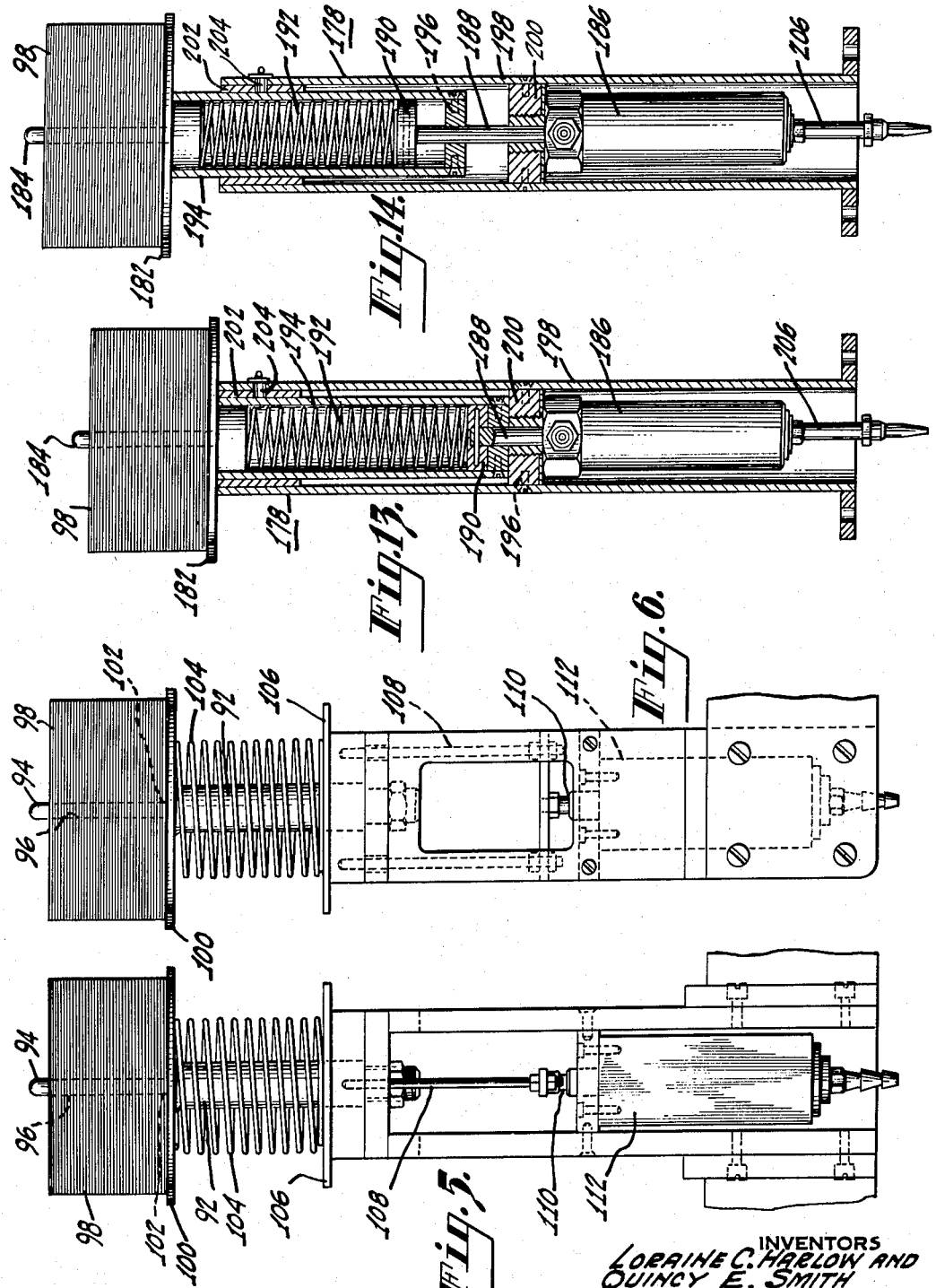

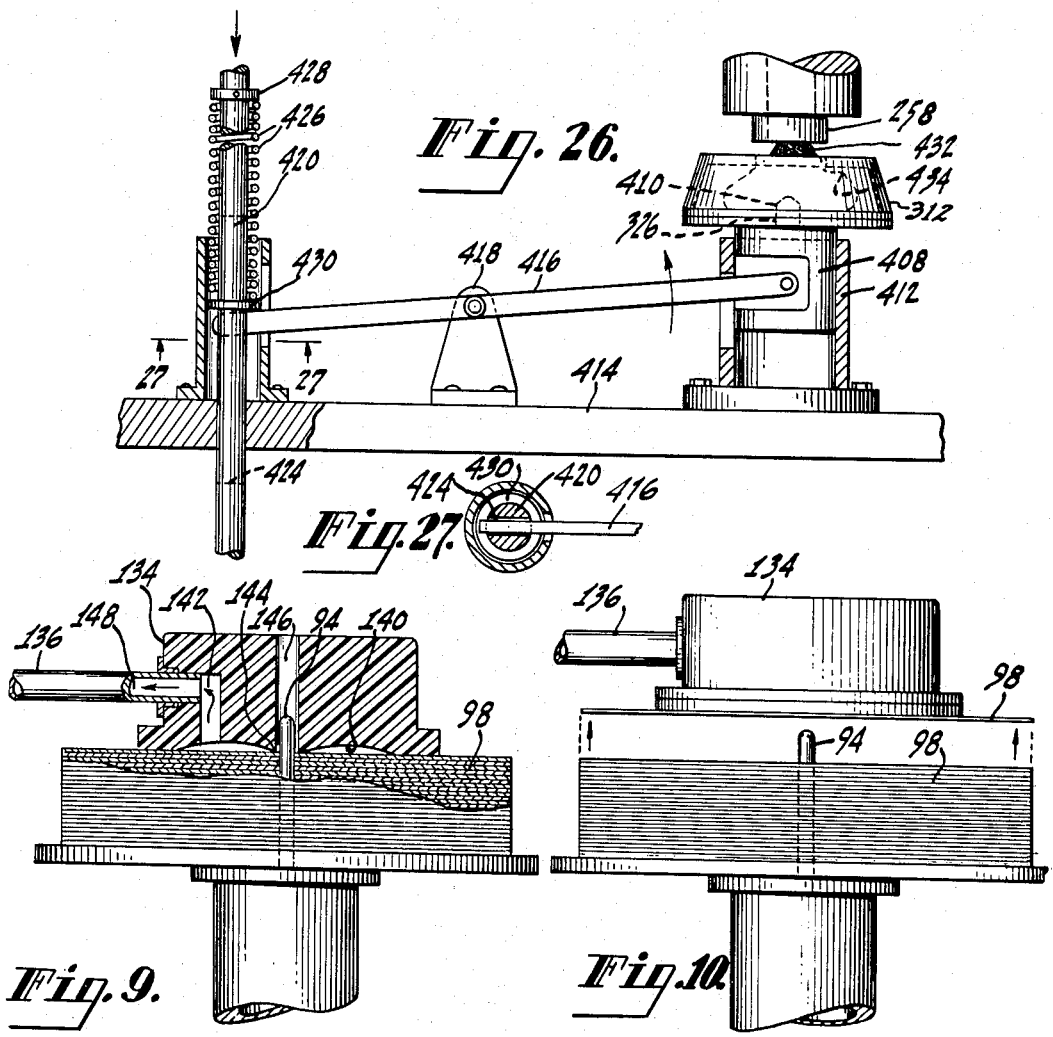

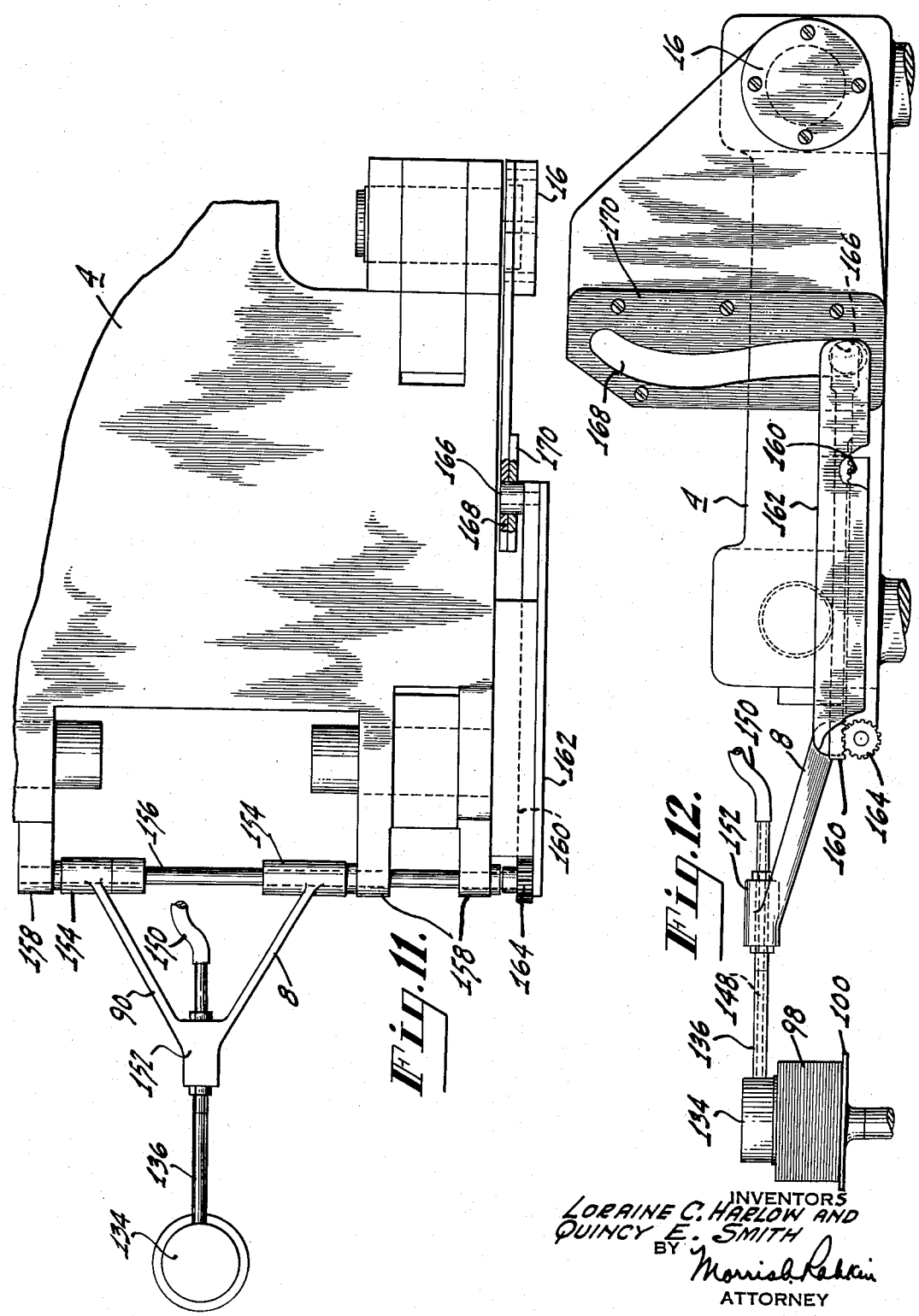

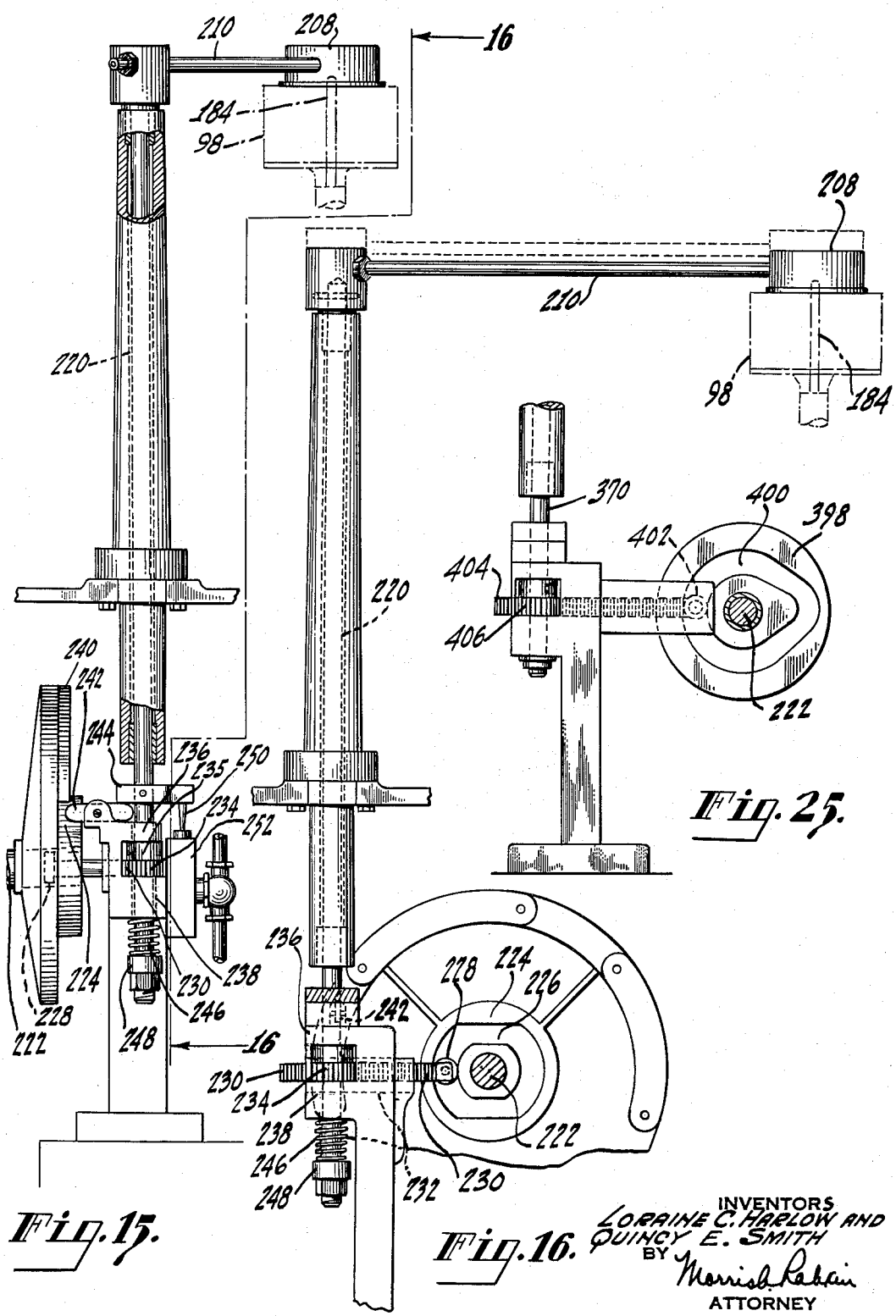

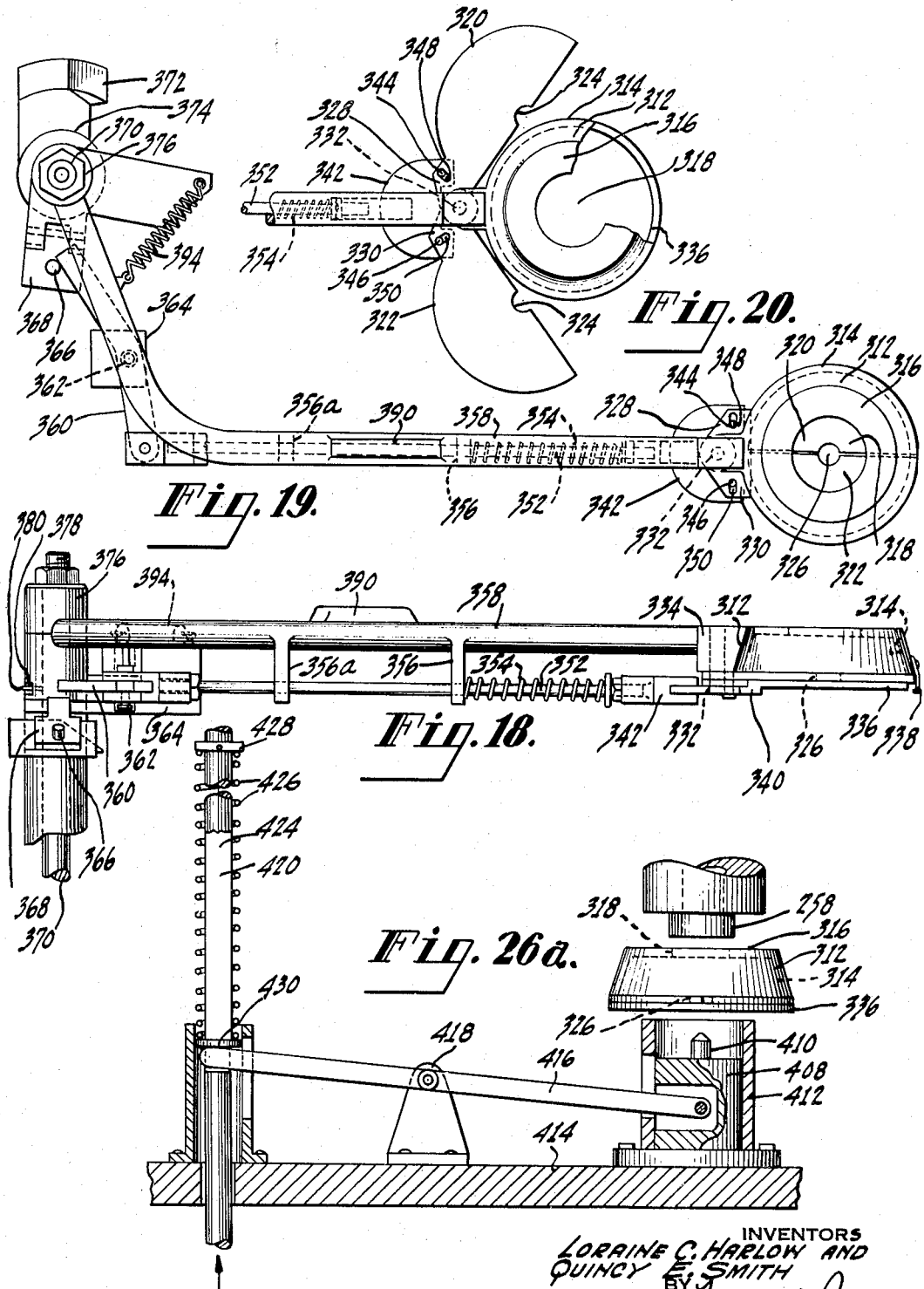

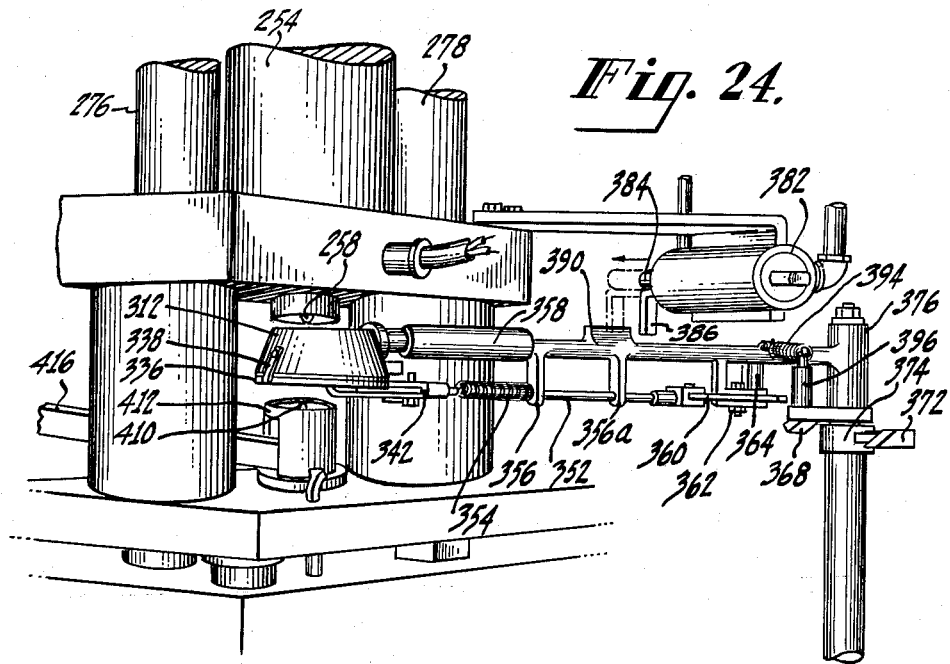
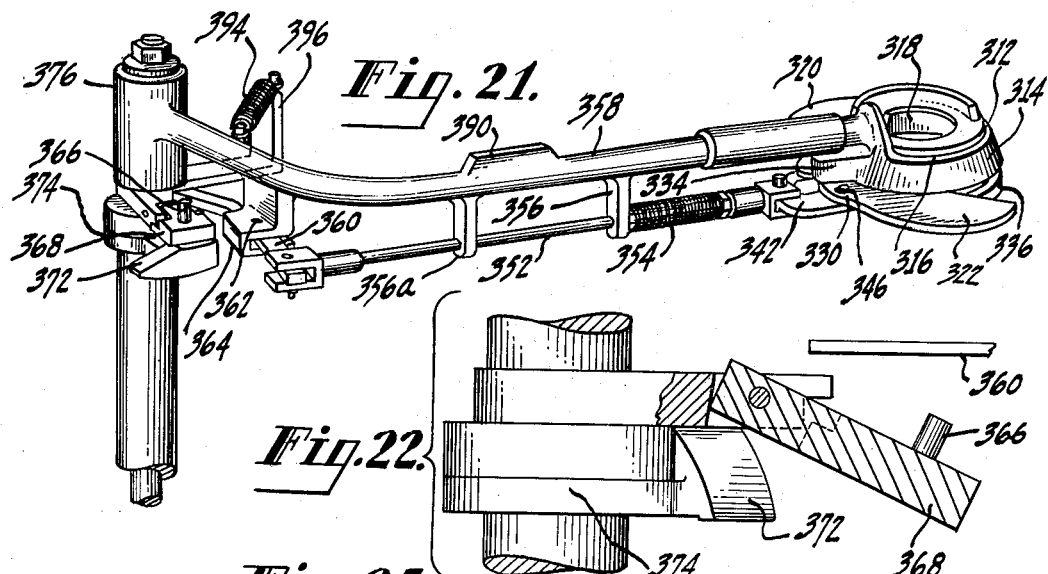

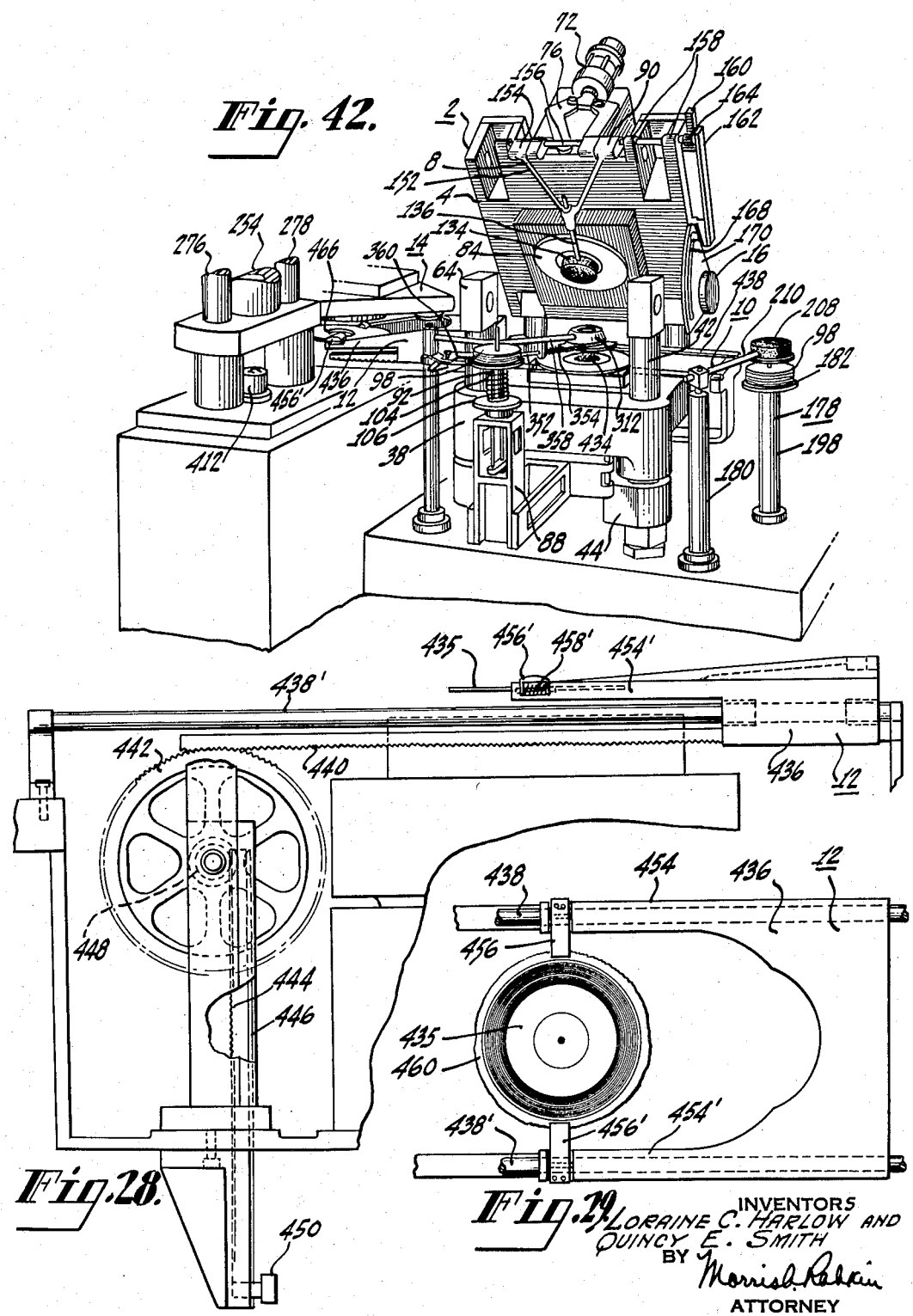

May 1, 1956 L. C. HARLOW ET AL 2,743,478
AUTOMATIC MOLDING APPARATUS
Filed Oct. 31, 1951 17 Sheets-Sheet 13

INVENTORS
LORAINE C. HARLOW AND
QUINCY E. SMITH
BY
ATTORNEY

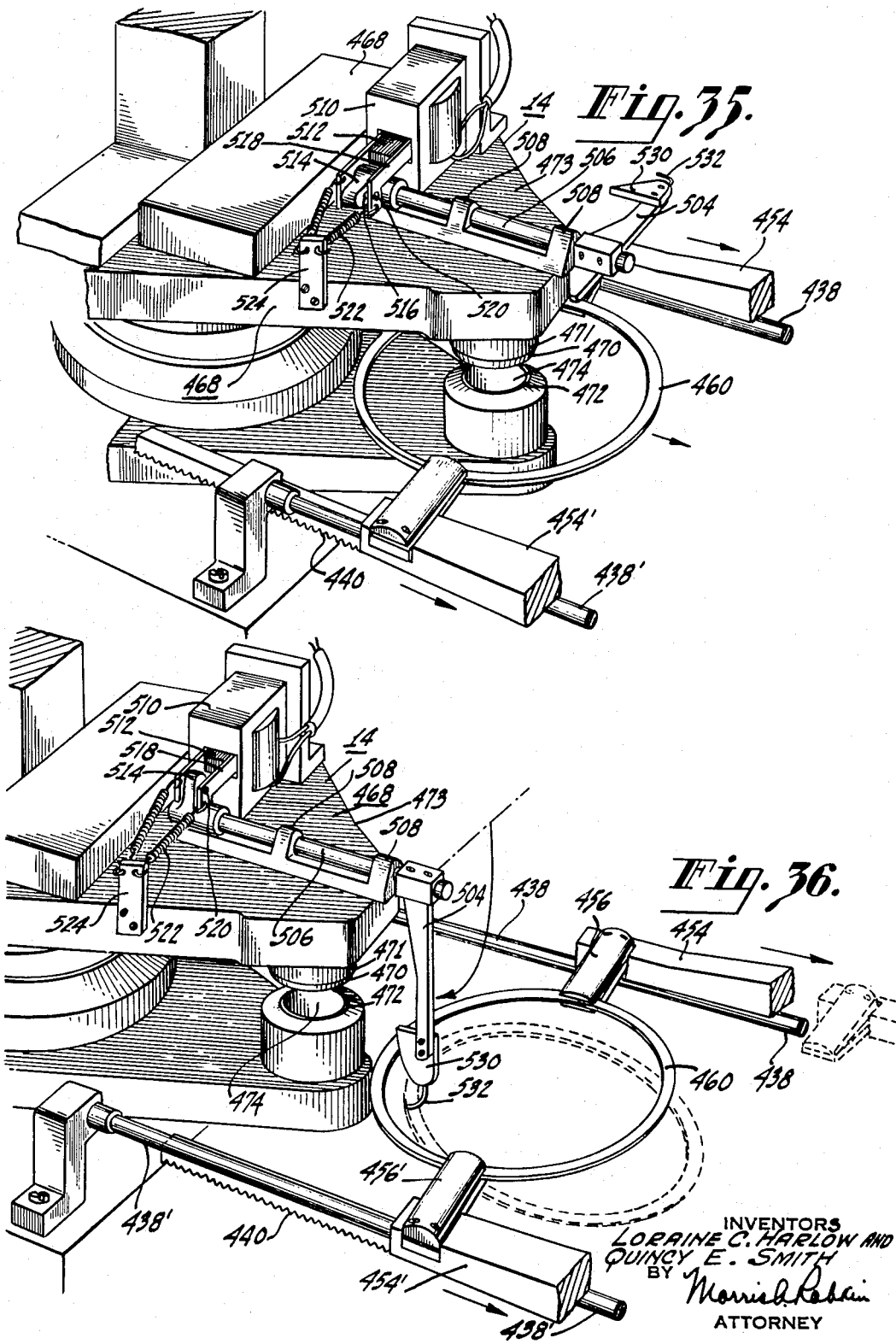

May 1, 1956 L. C. HARLOW ET AL 2,743,478
AUTOMATIC MOLDING APPARATUS
Filed Oct. 31, 1951 17 Sheets-Sheet 15
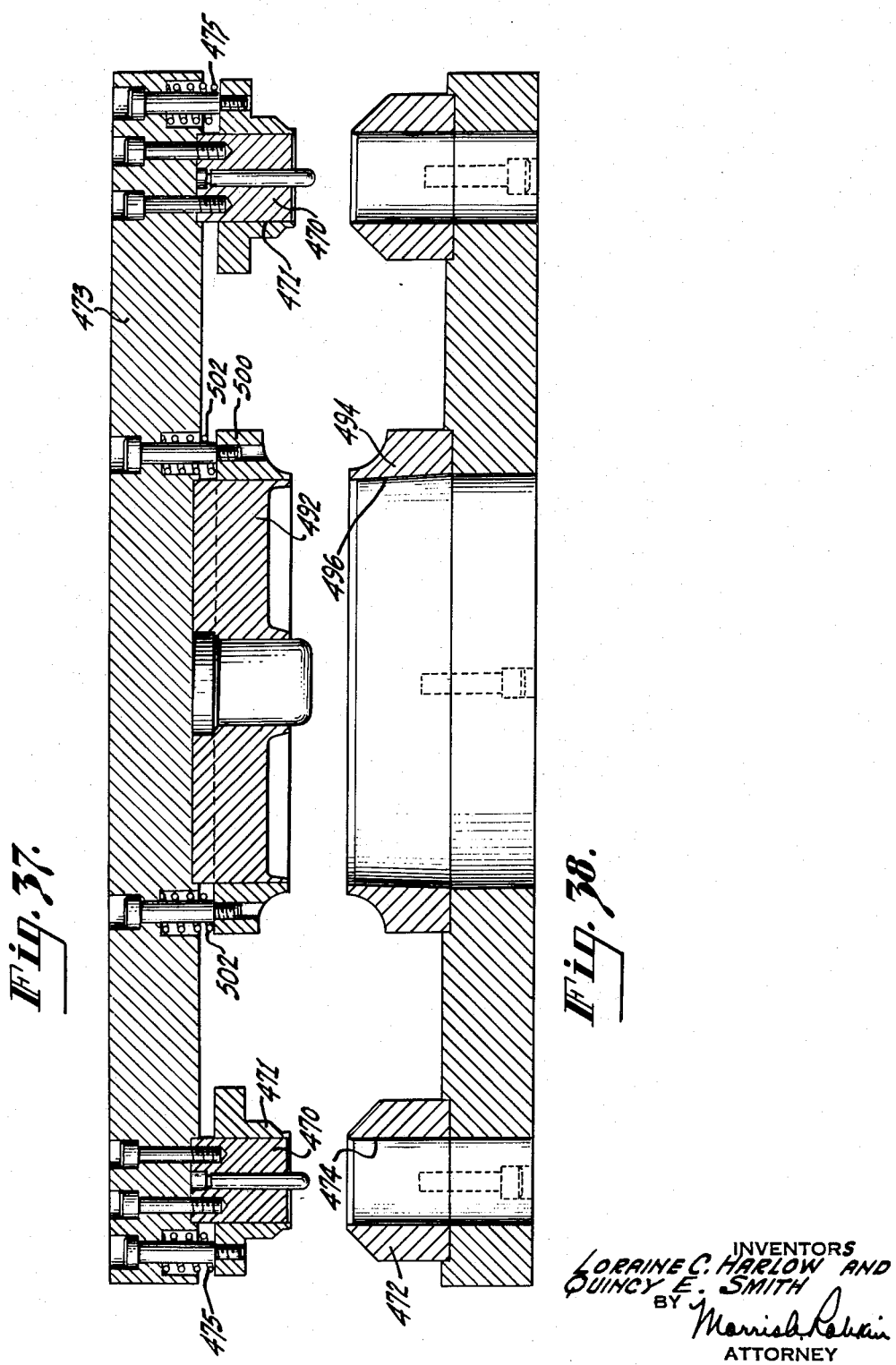
INVENTORS
LORRAINE C. HARLOW AND
QUINCY E. SMITH
BY
ATTORNEY May 1, 1956

L. C. HARLOW ET AL 2,743,478

AUTOMATIC MOLDING APPARATUS

Filed Oct. 31, 1951

17 Sheets-Sheet 16

INVENTORS
LORAINE C. HARLOW AND
QUINCY E. SMITH
BY
ATTORNEY

United States Patent Office 2,743,478
Patented May 1, 1956

2,743,478

AUTOMATIC MOLDING APPARATUS

Loraine C. Harlow, Greenfield, and Quincy E. Smith, Indianapolis, Ind., assignors to Radio Corporation of America, a corporation of Delaware Application October 31, 1951, Serial No. 254,034

16 Claims. (Cl. 18—5.3)

This invention relates to improved molding apparatus, and, more particularly, to apparatus for accomplishing, automatically, several of the manufacturing steps which have previously been carried out manually in connection with molding certain types of articles from synthetic resin compositions.

Although the apparatus of the present invention may be used for molding many different types of articles from compositions including one or more resinous binders, with or without fillers and small percentages of other ingredients, such as plasticizers and stabilizers, it is especially adapted for the automatic manufacturing of phonograph records.

Prior art

In the past, phonograph records have been molded by both compression molding apparatus and injection molding apparatus but, because of certain economic factors, and engineering considerations as well, the large majority of records have been compression molded. Compression molding, however, has required a number of manual operations by the press operator. Thus, the labor cost involved in record manufacturing has been relatively high.

In general, the compression molding process for making disc records has been about as follows: The molding composition, after mixing in a Banbury type mixer, has been sheeted on large rollers, scored, and cut into flat rectangular pieces called "biscuits." An operator, in molding a record, first placed a label on each of the upper and lower molds, then placed one of the "biscuits" over the label on the lower mold face. The "biscuit" may have been preheated to soften it somewhat.

The operator then operated an air valve which closed the press platens and started the operation of a timer which controlled a cycle of heating and cooling operations within the platens. At the end of the cycle, the press opened automatically. The operator next removed the record from the lower platen manually. Since the record still had a ring of flashing attached, this had to be removed. If the composition was of the unfilled type, the flashing ring either had to be severed by running a knife around the record or, more recently, it was trimmed off in a punch and die apparatus. The record had to be hand-fed to the trimming apparatus, however.

There have been several variations to the above process in common use depending, mostly, on the type of composition being used. For example, compositions consisting essentially of a resin, such as Vinylite, have also been applied to the mold in pellet form instead of in "biscuit" form.

Summary of present invention

The present invention provides completely automatic apparatus for accomplishing mechanically all of the steps in the above described process which were previously performed manually. More specifically, the apparatus of the present invention provides, in addition to the conventional compression molding press having a set of molding platens and means for opening and closing the platens, a series of improvements which may be used singly, or as a complete group, or in any combination desired. These improvements are: (1) means responsive to the opening of the platens for placing labels thereon, (2) means, also responsive to the opening of the platens, for placing a charge of moldable material between the platens, after the labels have been positioned (if labels are used), (3) means responsive to opening of the platens for removing a molded article from the platens and carrying it to a remote position, and (4) means disposed at the remote position for performing certain finishing operations including the trimming of the flashing from the article and disposing of the flashing.

Objects of the invention

One object of the invention is to provide an improved apparatus for manufacturing molded articles.

Another object of the invention is to provide improved apparatus for manufacturing articles molded from resinous compositions.

Another object of the invention is to provide novel apparatus for automatically performing a number of steps in disc record manufacturing.

Another object of the invention is to provide improved automatic molding apparatus.

Another object of the invention is to provide improved compression molding apparatus.

A further object of the invention is to provide apparatus for automatically providing molded articles with molded-in labels.

Another object of the invention is to provide improved means for introducing a charge of moldable material between the platens of a compression molding press.

Another object of the invention is to provide improved means for removing a molded article from between the platens of a molding press and carrying the article to a position remote from the platens.

Another object of the invention is to provide improved means for trimming flashing from a molded article.

Another object of the invention is to provide novel apparatus for accomplishing in timed and synchronized sequence the operations of: positioning labels on either or both platens of a compression molding press, introducing a charge of moldable material between the platens, closing the platens, carrying out a cycle of heating and cooling steps within the closed platens, opening the platens, removing the molded article and carrying it to a finishing station, and performing certain finishing operations on the article.

Another object of the invention is to provide improved apparatus for accomplishing automatically and in timed sequence at least one of the following manufacturing steps accompanying a compression molding operation of conventional type: positioning labels on either or both press platens, introducing a charge of moldable material between the platens, removing a molded article from the press and carrying it to a remote location, and performing one or more finishing operations on the pressed article.

Still another object of the invention is to provide novel apparatus for accomplishing automatically, in timed sequence, the steps of: positioning labels over the center pins of sound record molds seated on upper and lower platens of a compression molding press, placing a measured charge of preheated molding composition over the label on the lower mold, closing the press platens and carrying out a cycle of heating and cooling steps thereon, opening the platens, removing the molded record from the molds, carrying the record to a location remote from the platens, and performing one or more finishing operations on the record.

These and other objects will be more apparent and the invention will be more readily understood from the following detail description, and the accompanying illustrative drawings, of which:

List of figures

Figure 1 is a perspective view of an embodiment of apparatus showing most of the features of the present invention and including the molding press with its platens in closed position, near the end of a pressing cycle, Figure 2 is a right hand end elevation view of the molding press portion of the apparatus shown in Figure 1, Figure 3 is a plumbing diagram of the air and water connections of the complete apparatus as shown in Figure 1.

Figure 30:
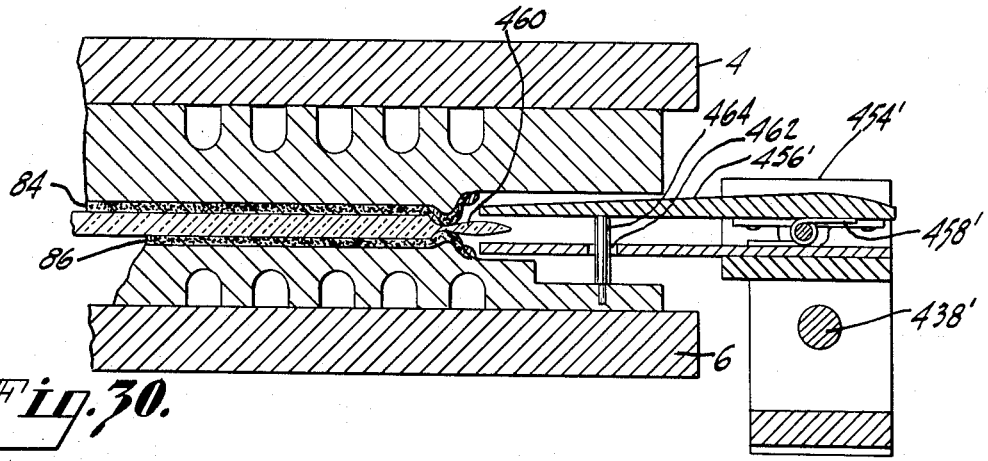
Figure 31:
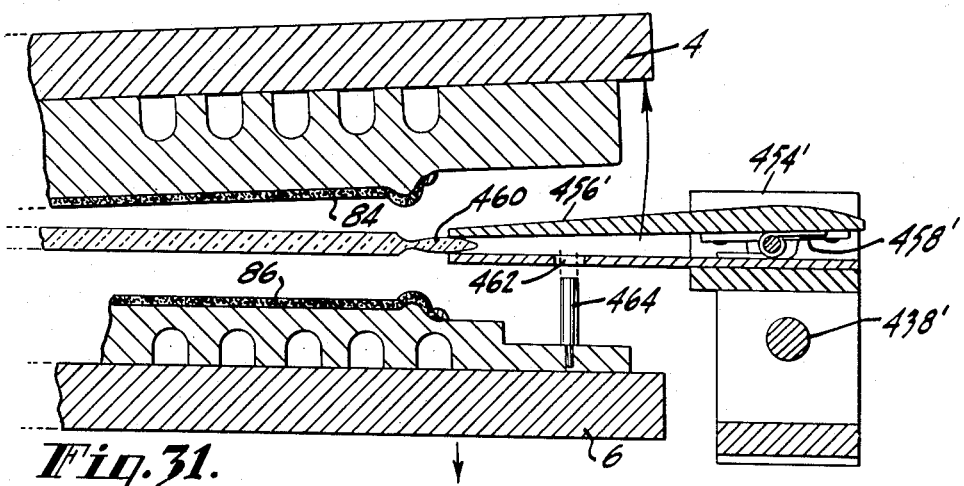
Figure 39:
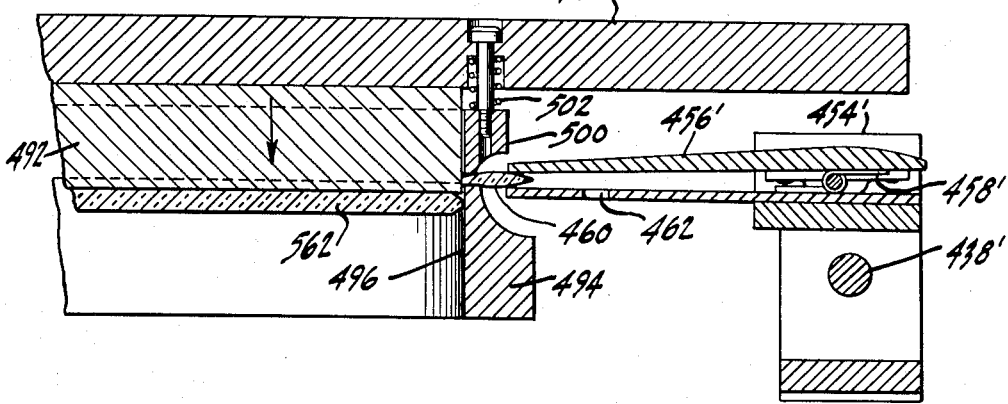
Figure 32:
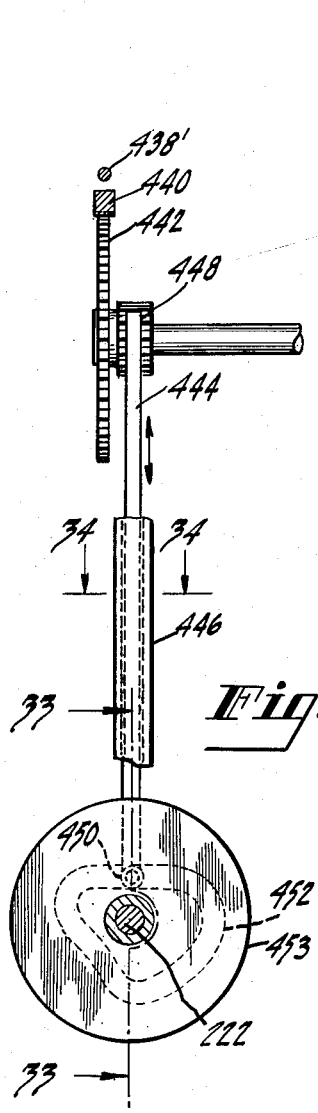
Figure 33:
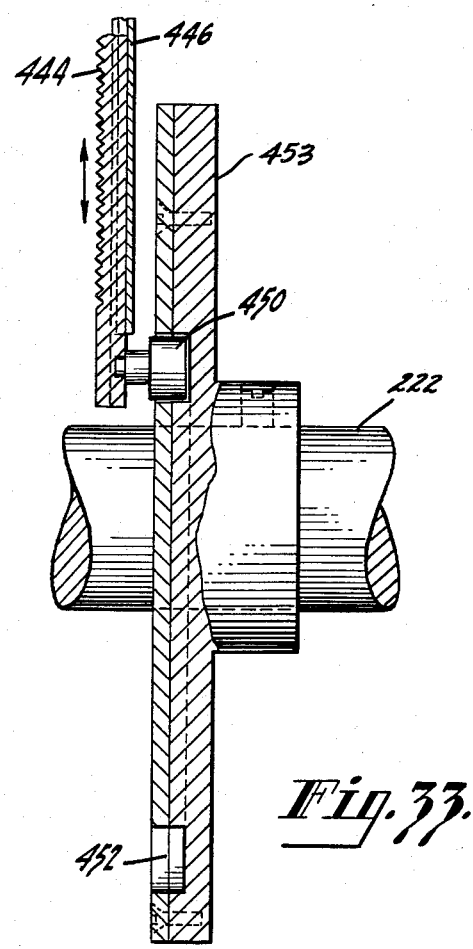
Figure 34:
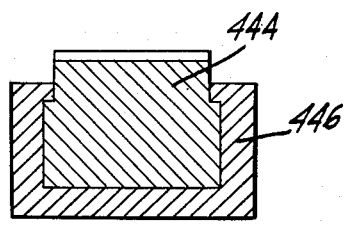
Figure 40:
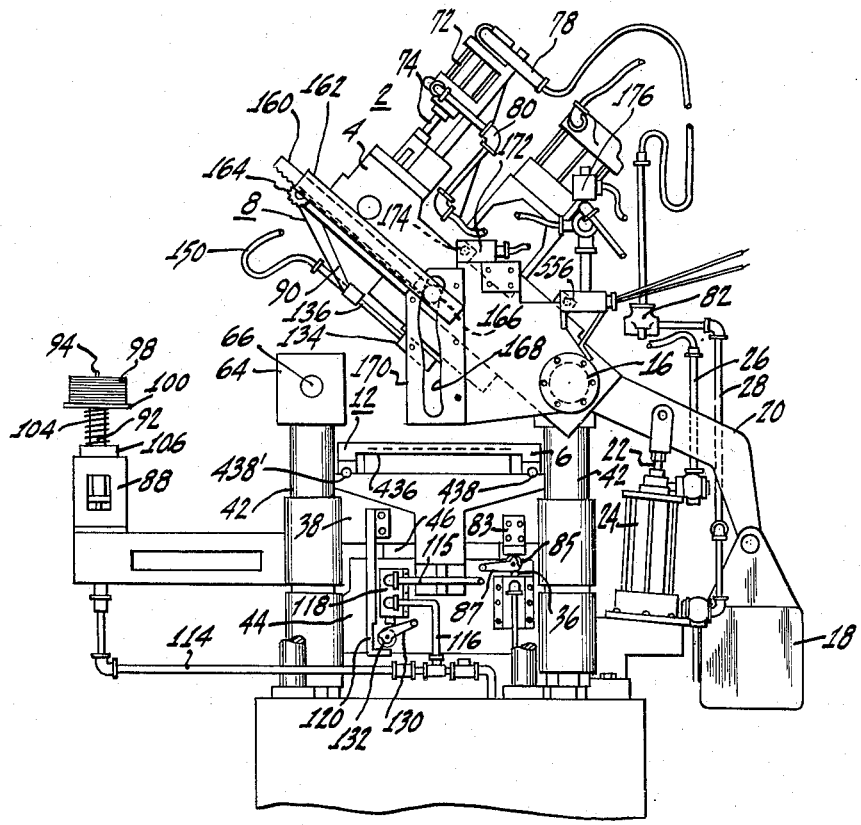
Figure 17:
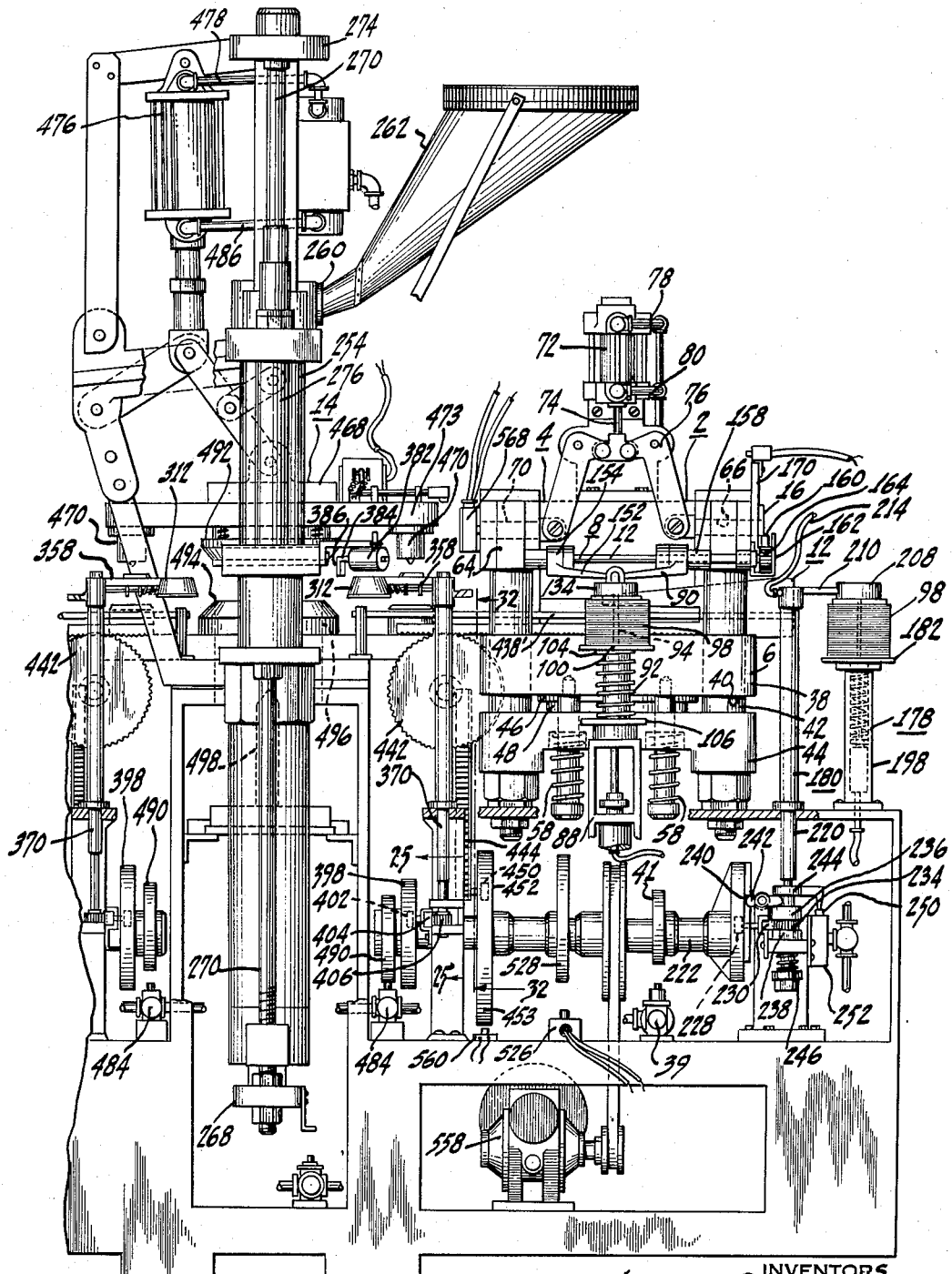

Figure 3a is a detail view of the vacuum connections to the upper and lower label loaders, Figure 4 is a partial perspective view taken at the same angle as that of Figure 1 of the molding press and a part of the extrusion apparatus, with the press platens open and the upper label being applied, Figure 5 is a front elevation view of one embodiment of upper label stack holder that may be a part of the present invention, Figure 6 is a side elevation view of the apparatus of Figure 5, Figure 7 is an enlarged fragmentary view, partly in section, of a valve and valve tripping mechanism operated by movement of the lower press platen, Figure 8 is an end view taken on the line 8—8 of Figure 7, Figure 9 is an elevation view, partly in section, of either of the label pick-up cups and label stack platforms which may be included in apparatus of the present invention, Figure 10 is an elevation view of the apparatus of Figure 9 with the cup lifted from the label stack, Figure 11 is a top plan view, partly broken away, of the upper label transfer mechanism which is a part of the present invention, Figure 12 is a side elevation view of the apparatus of Figure 11, Figure 13 is an elevation view, partly in section, of a lower label stack holder in accordance with the present invention, the stack holder being in its lower position, Figure 14 is a view similar to that of Figure 13 but with the stack holder in its raised position, Figure 15 is a front elevation view, partly in section, of the lower label transfer mechanism included in the present invention, Figure 16 is a side elevation view, partly in section, taken along the line 16—16 of Figure 15, showing the label loader arm in raised position in phantom, Figure 17 is a front elevation view, partly in section, of a complete embodiment of apparatus in accordance with the present invention, with the press platens in closed position, Figure 18 is a partial side elevation view of an embodiment of molding compound transfer mechanism which may be a part of the present invention, Figure 19 is a top plan view of the apparatus of Figure 18, Figure 20 is a top plan detail view of the cup portion of the apparatus of Figures 18 and 19 with the cup doors open, Figure 21 is a perspective view of the apparatus of Figures 18 and 19 showing the mechanism in the act of opening the compound cup doors, Figure 22 is a detail view, partly in section, of the tripping pin portion of the apparatus of Figure 21, with the pin in lowered position, Figure 23 is a view of the apparatus of Figure 22 with the pin in raised position, Figure 24 is a partial elevation view of the compound transfer mechanism with the compound cup in the act of being positioned beneath the compound extrusion orifice, Figure 25 is a side elevation view, partly in section, taken along the line 25—25 of Figure 17, Figure 26 is an elevation view, partly in section, of that part of the apparatus of the present invention used to form a depression in the bottom of the gob of molding compound before the compound is placed between the molding platens, the parts being shown as positioned during an extrusion stroke, Figure 26a is a view similar to that of Figure 26 showing the parts at the beginning of an extrusion stroke, Figure 27 is a section view taken along the line 27—27 of Figure 26, Figure 28 is a side elevation view, partly broken away, of the article remover mechanism which is a part of the present invention, Figure 29 is a top plan view of part of the apparatus of Figure 28, Figure 30 is a fragmentary view, shown in section, taken through the press platens in closed position during the molding process and showing part of the record remover apparatus of Figures 28 and 29, Figure 31 is a view similar to that of Figure 30 with the press platens opening after an article has been molded, Figure 32 is a side elevation view, partly in section and partly cut away, taken along the line 32—32 of Figure 17, Figure 33 is a side elevation view, partly in section, taken along the line 33—33 of Figure 32, Figure 34 is a section view taken along the line 34—34 of Figure 32, Figure 35 is a partial perspective view of one form of punch and die apparatus used to trim molded phonograph records produced in apparatus of the present invention and including one form of flash removal apparatus which is a part of the invention, Figure 36 is a view similar to Figure 35 with the flash remover apparatus in the act of removing a flashing ring, Figure 37 is an elevation, longitudinal section view of a set of upper punching dies such as may be used for trimming phonograph records made on apparatus of the present invention with the center punches in duplicate for use on a dual press, Figure 38 is a view similar to Figure 37 of a set of lower punching dies adapted to cooperate with the set shown in Figure 37, Figure 39 is a fragmentary view, shown in section, of the large diameter dies shown in Figures 37 and 38 in the act of trimming flashing from a phonograph record, Figure 40 is a partial side elevation view of the molding press with both platens in "open" position, Figure 41 is a partial perspective view of the apparatus of Figure 4 taken at a slightly later time in the operation cycle, and Figure 42 is a partial perspective view of the apparatus of Figure 41 at a still later time in the operation cycle with the article remover carriage being positioned at the second finishing station.

Overall description

A detail description of a preferred embodiment of a complete apparatus, constructed in accordance with the present invention, will now be given. Referring, first, to Fig. 1, the complete apparatus comprises a conventional molding press 2, preferably of the compression type, having an upper platen 4 and a lower platen 6, a device 8 for positioning a label on the upper platen, or on a mold mounted on the platen, a device 10 for positioning a label on the lower platen (or mold mounted on the platen), a compound loading device 11, an article-removing device 12, and an article-finishing device 14.

It will be understood, also, that although the apparatus about to be described in detail comprises a single press, a single compound extruder and a single punch press may be used to serve at least two molding presses. A partial view of a second press in such an arrangement is shown in Figure 17.

Molding press

The molding press may be any one of several conventional variations of compression molding presses. The preferred embodiment, as illustrated in Figure 1 and others, is one having an upper platen 4 mounted on a hinge 16 so that it may open and close pivotally. Referring particularly to Figure 2, means for opening and closing the upper platen may comprise a heavy counterweight 18, suspended from the rear wall of the platen by means of a projecting arm 20, and a piston 22 mounted within an air cylinder 24. One end of the piston is pivotally connected to the arm. The piston is operated by compressed air admitted to the top of the cylinder through an air line 26 and to the bottom of the cylinder through an air line 28. Referring to the plumbing diagram of Figure 3, air is admitted to these air lines from an air supply line 30, through a 4-way valve 32.

Air to the 4-way valve 32 is supplied through air line 33 which is connected to the main air line 30. Operation of this valve is controlled by air lines 34 and 37 which are connected to valves Nos. 6 and 7, respectively, of the press timer 35. Air line 34 has in it a valve 36 operated by movement of the lower press platen. Air line 37 has in it a similar valve 39 which is operated by a cam 41 on the main camshaft. Further operating details will be given later in the description of a complete operation cycle of the apparatus.

The lower platen 6 of the press is mounted for vertical movement between an open and a closed position. The lower platen is mounted on a rectangular shaped bolster 38, having cylindrical openings 40 in each of the four corners thereof, adapted to slide on four cylindrical guide posts 42, vertically mounted on the press bed 44.

The bolster 38 is fixed on the top end of a piston 46 mounted within a hydraulic cylinder 48 for vertical reciprocating motion. The piston is moved upward by water under 2,000 lbs./sq. in. pressure admitted to the bottom of the cylinder through a line 50 connected to a hydraulic water supply line 52 through a 3-way valve 54. Operation of this valve is controlled by air from an air line 56 connected to valve No. 4 of the press timer. Heavy springs 58 and the weight of the bolster cause the piston to move downward when the water pressure in the line 52 is cut off. The hydraulic cylinder is also provided with a drain line 60 connecting the 3-way valve 54 to the drain 62.

Conventional means may also be provided for locking the upper platen in its closed position. In the embodiment illustrated, this locking means comprises the upper portions of the two upwardly extending guide posts 42 mounted near the forward edge of the bolster 38, the top portions of these posts being constituted of rectangular metal blocks 64 having horizontally extending keyways 66 therein. The upper platen is provided with recessed portions 68 (see Figure 4) at the forward corners thereof, the recesses being dimensioned to fit closely over the blocks 64 when the upper platen is closed. A pair of cylindrical bolts 70, mounted on the upper platen, are adapted to be moved with a horizontal reciprocating motion into and out of locking engagement with the keyways 66 by means of an air cylinder 72 and piston 74 together with a mechanical linkage 76. Air is admitted to the upper and lower ends of this cylinder through air lines 78 and 80, respectively. The upper air line 78 is connected as a branch of air line 28 which supplies air to the lower end of air cylinder 24 which is used to open and close the upper press platen. In the air line 78 is a poppet valve 82 positioned on the press frame above the arm 20 and adapted to be operated by movement of this arm. With this valve open, air can be admitted to the upper end of the cylinder 72, causing the piston to move downward and shove the bolts 70 home in the keyways 66. The bolts are withdrawn by admission of air through the line 80 to the lower end of the cylinder 72. This line is a branch of the air line 26 leading to the upper end of cylinder 24.

Within the platens are conventional passages (not shown), through which steam and cold water may be alternately circulated in carrying out the usual heating and cooling steps of a molding cycle. Flexible hose connections 89 are provided for connecting the passages to suitable sources of the heating and cooling mediums. Cold water is supplied through a line 91 opened and closed automatically by a 2-way valve 93, the diaphragm of which is operated by an air line 95 to valve No. 2 of the press timer. Steam is admitted to the molds through a line 97 controlled by a 2-way valve 99 having a diaphragm operated automatically by air from a line 101 to valve No. 1 of the press timer.

Clamped to the upper and lower platens are molds 84 and 86, respectively, each bearing the negative of the contours of one-half the molded article. When the article being molded is a phonograph record, these molds carry the negative replicas of the sound tracks of either side of the record.

The upper label loader

One of the important features of the present invention is the means for automatically depositing a label on the mold, which is mounted on the upper platen, each time the press opens. This label loading device includes means 88 mounted on the press frame for holding a stack of labels and means 90 for picking a label from the stack and centering it on the mold.

Referring now to Figures 5 and 6, the stack holding means includes a vertically extending spindle 92, the upper portion 94 of which has a diameter slightly smaller than the centering holes 96 of the labels 98 which it is designed to hold. A label stack support platform 100 having a center opening 102, also adapted to fit over the upper portion of the spindle, rides on this upper portion in a manner to permit limited sliding movement thereover. The lower side of the platform rests on the upper end of a light gauge coil spring 104, the lower end of which rests on a base plate 106 fixed to the spindle shaft. Thus, the platform 100 may move up and down on the spindle as more or fewer labels are stacked upon it.

The label platform base plate 106 is connected through a yoke 108 to a piston 110, mounted for reciprocating motion within an air cylinder 112. The air cylinder is supplied with compressed air from the main air supply line 30 through a branch 114 of an air line 116 leading from the outlet port of a valve 118. The valve 118 is operated by a tripping bar 120 (see Fig. 2) connected to the lower press platen. The platform 100 is raised and lowered at appropriate times during the operations cycle of the apparatus by air supplied to the cylinder 112 through the valve 118 and the air lines in a manner that will be more fully explained in a following section describing an operation cycle of the complete apparatus. Referring to Figures 7 and 8, the valve 118 comprises a cylinder 122 having an air intake port 124 and an air outlet port 126. The air intake port is connected to a branch supply line 115. The outlet port is connected to the outlet line 116. The valve cylinder has a spring-biased plunger 128 for opening and closing these ports, and a pivoted arm 130 carrying a contact roller 132 against which the tripping bar 120 is pressed when the lower press platen moves upward.

Referring more particularly to Figures 9, 10, 11 and 12, the means 90 for picking up successive labels from the upper platen label stack comprises, in the preferred embodiment illustrated, a pneumatic pick-up device. This device includes a vacuum cup 134 connected to the outer end of an arm 136 pivotally mounted adjacent the leading edge of the upper press plate. Means is provided for automatically causing the vacuum cup to swing inward and deposit a label over the center spindle of the upper platen every time this platen is moved to its open position.

Referring more particularly now to Figures 9 and 10, the vacuum cup portion 134 of the pneumatic pick-up device comprises a disc shaped head having on its lower surface an annular shaped concave recess 140 into which a suction passage 142 enters from the interior of the head. The recess is concentric with a central raised hub 144. The head also is provided with a central opening 146 which extends entirely through the head from the hub 144 to the upper surface of the head. This opening is to accommodate the upper end of a spindle holding a stack of labels.

The cup 134 is connected to an end of the pivotally mounted arm 136. This arm is provided with a central passage 148, connected at one end through flexible tubing 150 to a suction device (not shown) and at the other end to the suction passage 142 of the head. The arm 136 is also mounted on a bifurcated yoke 152 having base members 154 fixedly attached to an axle 156 mounted to rotate within bearings 158 which are, in turn, mounted on the leading edge of the upper press platen.

Mechanism is provided for rotating the axle 156 in a desired manner. Referring now to Figures 11 and 12, this rotation means comprises a rack 160 mounted within a guideway 162 disposed along one sidewall of the upper press platen, and a coacting pinion gear 164 mounted adjacent one end of the axle 156. Reciprocating movement of the rack causes rotational movement of the pinion gear and the axle to which this gear is attached. Rotation of the axle causes the arm 136 and the vacuum cup 134 to swing in an arc which is substantially that of a semi-circle.

The rack 160 is driven reciprocally by opening and closing of the upper press platen. A cam follower 166 is connected to the inner end of the rack and the cam follower rides in a cam-track 168 disposed within a plate member 170 fixedly mounted to the hinge 16 of the upper press platen. When the upper press platen is swung open, the cam follower moves forward along the side of the platen, guided by the cam track. The rack is pushed forward by the cam follower. When the upper platen is swung to its closed position, the cam follower reverses its movement, pulling the rack along with it.

The upper label loader also includes means for automatically turning the suction applied to the vacuum cup on and off during certain parts of the cycle. This means comprises a microswitch 172 mounted on the rearward portion of the press frame and a tripping lever 174 mounted on the upper surface of the upper press platen. As the upper platen approaches its open position, the tripping lever operates the microswitch which, in turn, operates a solenoid valve 176 disconnecting the suction device from the vacuum cup.

*The lower label loader*

Another important feature of the present invention is a means for automatically depositing a label on the mold which is mounted on the lower press platen, each time the press opens after a cycle of molding operations. This label loading device, like the one previously described for depositing labels on the upper platen mold, includes, in general, means 178 for holding a stack of labels and means 180 for transferring a label from the stack to the mold.

Referring to Figures 13 and 14, the means for holding this stack of labels comprises a label stack platform 182 on the upper surface of which is mounted a label spindle 184 having a diameter slightly less than the diameters of the center holes of the labels.

Means are provided for raising the label stack platform, so that the top label may be placed in position to be removed by the label-transferring means, and for lowering the stack again to normal rest position. This means comprises an air cylinder 186 having a piston 188, to the upper end of which is attached a head 190. A coil spring 192 rests on the head. The upper end of the spring supports the label platform 182. Surrounding the spring is a cylindrical sleeve 194, the upper end of which is connected to the lower surface of the label platform. The lower portion of the sleeve 194 makes sliding fit with the spring supporting head 190. The lower end of the sleeve is also provided with an annular shaped closure member 196 having a central opening which makes sliding fit with the piston 188.

The entire label stack lifting mechanism is provided with a cylindrical housing 198. The piston 188 is also provided with a mounting collar 200 fixedly mounted to the housing 198.

Between the inner surface of the upper portion of the housing 198 and the outer surface of the sleeve 194 is a cylindrical bushing 202 which is attached to the housing. This bushing is provided with an oil cup 204 for lubricating the outer surface of the sleeve 194.

Air is supplied to the air cylinder 186 from main air supply line 30 through a branch air line 206 fed through the same valve 118 which admits air to the label stack cylinder of the upper label loader. Thus, both stacks of labels are raised in a similar manner and, simultaneously, in response to upward movement of the lower press platen as previously described. When the stack holder piston 188 moves upward, force is exerted on the coil spring 192 being transmitted through the spring to the label platform 182, thus raising the platform.

Referring now to Figures 15 and 16, the label transferring mechanism comprises a pneumatic pick-up cup 208, having all parts similar to those of the other pick-up cup 134, means for applying suction to the cup, an arm 210 for holding the cup in an extended position, and means for moving the cup and the arm in both a horizontal swinging motion and in limited vertical, reciprocal directions. The arm 210, which is connected to the pick-up cup 208 is provided with a central passage similar to the passage in the arm 136, and the passage is connected to a flexible tubing 214 leading to a suction line 216 having a solenoid control valve 218.

The vacuum-cup arm 210 is supported by a vertical, rotatably mounted shaft 220 which is also provided with means for moving the shaft in vertical, reciprocal directions. Both the rotational movement and the vertical movement are imparted by cams driven from the main cam driveshaft 222 mounted horizontally on the frame of the apparatus beneath the molding press. Rotational movement is obtained by means of cam 224, having a cam track 226, mounted on the main driveshaft and rotatable therewith. As the cam rotates, a cam follower 228 rides in the cam track 226 so that, as the cam track follows a rotary motion, the cam follower moves back and forth horizontally. The cam follower is connected to a rack 230, mounted in a guideway 232, the rack being carried forward and backward with a reciprocating motion along with the cam follower 228. The rack 230 meshes with a pinion gear 234 mounted in driving relationship to the lower portion of the shaft 220. The pinion gear is also mounted so that the shaft can slide vertically with respect to the gear. This is accomplished by mounting the pinion gear in a bracket having an upper arm 236 and a lower arm 238 which prevent vertical motion of the gear, and the gear and shaft are each provided with a complementary flat so that the gear and shaft must rotate together. The gear 234 may be provided with a hub 235. Thus, rotation of the main cam driveshaft causes rotation of the label loader shaft 220 and imparts a horizontal swinging motion to the arm 210 and pick-up cup 208.

Vertical motion of the shaft 220 is imparted by another cam 240 mounted on the main cam driveshaft 222 and rotatable therewith. As this cam rotates, it strikes one end of a pawl 242 pivotally mounted on the mounting bracket for the gear 234. The other end of the pawl engages a collar 244 fixedly mounted on the shaft 220 of the label loader. When the cam 240 presses down on one end of the pawl, the other end rises and pushes both the collar and the shaft upward. As the cam continues to rotate, it releases its pressure on the pawl, and the collar and shaft are permitted to drop back to normal rest position. A coil spring 246, one end of which rests on a collar 248 mounted on the shaft 220 adjacent its lower end and the other end of which bears against the under side of the arm 238 in which the shaft 220 is mounted, aids in moving the label loader shaft back to its rest position.

Releasing of the suction applied to the lower label loader pick-up cup 208, when the cup is positioned over the center of the lower mold, is also accomplished by motion of the loader shaft 220. A pin 250 extends vertically downward from the collar 244. When the shaft 220 is turned such that the cup 208 is over the center of the lower press mold, the pin is positioned over the plunger of a microswitch 252. The dropping of the shaft to its lower position causes the pin to engage the plunger of the switch, closing the solenoid valve 218, in the suction line 216, cutting off suction in this line. Raising of the shaft 220 raises the pin from the plunger of the microswitch 252 and opens this microswitch, which opens the solenoid valve again.

The compound extruder

The compound extruder, per se, which will now be described as suitable for use with the apparatus of the present invention, is not a part of the invention. The combination of the extruder and the compound loader which will be described later, is considered a part of this invention, however.

Referring now to Figures 1 and 17, a suitable compound extruder comprises a vertically mounted cylinder 254, fitted with an extrusion plunger 256, and also an extrusion orifice 258 at its lower end. Conventional external and internal means (not shown) are provided for maintaining the plastic molding composition, to be extruded from the cylinder, in a plastic state. The heating means may be connected to the steam line 97 through a branch line 259. Composition is supplied to the cylinder through an opening 260 in the cylinder casing, adjacent its upper end, by means of a funnel or hopper 262.

The extrusion plunger may be operated by conventional hydraulic means. This means may comprise a double-acting, water-operated hydraulic cylinder 264 having a piston 266. The cylinder is disposed within the base of the apparatus beneath the extrusion means. The hydraulic piston is connected to a lower cross-bar member 268 to which connecting rods 270 and 272 are also attached. These rods extend upward to an upper cross-bar member 274, through guide cylinders 276 and 278, respectively. The extrusion plunger 256 is connected to the upper cross-bar member. The extrusion plunger is operated with a reciprocating motion by admitting water alternately to opposite ends of the hydraulic cylinder. The upper end of the hydraulic cylinder is supplied with water under pressure by a line 280 connected through a 3-way valve 282 to the hydraulic supply line 52. This valve also has connected to it a drain line 284 to drain off the water from the hydraulic cylinder when the piston is moving upward. The diaphragm of the 3-way valve 282 is controlled with air from a line 286 connected through one side of a 4-way valve 288 to a line 290 connected to the main air supply line through a line 306. Air flow through this side of the 4-way valve is controlled by a line 292 from one end of the valve to valve No. 5 of the press timer.

The lower end of the hydraulic cylinder is supplied with water by a line 294 connected through a 3-way valve 296 to the hydraulic supply line 52. This valve also has a drain line 298 to receive water drained from cylinder 264 when the piston is moving downward. The diaphragm of the valve is controlled by air from a line 300 connected to the other side of 4-way valve 288. This side of the 4-way valve is controlled by a poppet valve 302 in branch air line 304 connected through line 306 to the main air supply line, which valve is opened during the downward stroke of piston 266.

The compound loader

Another important feature of the present invention is a means for receiving measured charges of molding composition and depositing each charge, at the proper point in the press operation cycle, between the press platens or, more specifically, between the press molds. This mechanism, which will be referred to generally as a compound loader, comprises a cup 312 for receiving a charge, or gob, of plastic composition from the orifice 258 of the extrusion cylinder 256 together with mechanism for automatically dumping the contents of the cup at the molding station. It may include means for automatically forming a depression in the bottom of the plastic gob so that it may be dropped over the spindle of the lower mold (if phonograph records are being molded) without rebounding, and also includes means for automatically moving the receiving means back and forth between the compound loading station; that is, the extrusion orifice, and the molding station; i. e., the press platens, or molds.

Referring now to Figures 18, 19, and 20, in more detail, the compound receiving means comprises the cup 312, having side walls 314 tapering outwardly in a downward direction. Although cups having any other desired shapes can be used, the use of a cup shaped in this manner permits the formation of a gob having a relatively broad base. The top of the cup is also provided with an annular closure member 316 having a central opening 318 therein through which the molding composition is adapted to be deposited. The top closure may be omitted, if desired, but serves to keep the compound from rising too high in the cup.

The compound cup is provided with bottom doors capable of being opened and closed, and mechanism is provided for performing the opening and closing actions automatically. The bottom of the cup thus comprises two doors 320 and 322 in the form of half-discs, each door having a similar cut-away semi-circular portion 324 such that when the doors are closed a centrally located circular opening 326 is present. The function of this opening will be explained later. The doors are provided with hinge portions 328 and 330, one of which is slightly stepped so that the two can be mounted in overlapping relationship. The hinged portions are pivotally mounted by means of a hinge pin 332, the upper end of which is fixed in a stud 334 formed of a protruding portion of the rear wall of the cup and which pin passes through openings in the overlapped parts of the hinges 328 and 330. A circular rim 336 of narrow width is provided beneath the outer edges of the doors to provide additional support when the cup is loaded. The front of the rim is supported from the front wall of the cup by means of a metal strip 338 and the rear of the rim is provided with an extended portion 340 having a hole through which the hinge pin passes.

Referring additionally to Figure 21, the mechanism for opening and closing the doors comprises a bifurcated yoke member 342 having pins 344 and 346 extending upwardly from each of its arms. Each of these pins engages a slot 348 and 350, respectively, in one of the hinge portions 328 or 330. A shaft 352, biased to a normally forward position by a coil spring 354 is connected to the yoke 342. One end of the spring 354 is seated against a support member 356 extending downwardly from an arm 358 from which the cup is suspended. The shaft 352 extends through openings provided in this support member 356 and one or more similar support members 356a spaced along the arm. When the shaft 352 is pulled backward against the biasing force of the spring 354, the yoke 342 is also pulled backward and the pins 344 and 346 cause the doors 320 and 322 to swing outward to their open position. Release of the force pulling back on the shaft 352 permits the spring to push the yoke forward to close the doors.

Automatic opening and closing of the doors is brought about by apparatus comprising a first class lever member 360 pivoted on a fulcrum pin 362, which is mounted on a bracket 364 attached to the under side of the cup support arm 358. One end of the lever arm is pivotally connected to the rear end of the shaft 352 which is connected to the yoke 342. Pressure on the opposite end of the lever arm causes it to pull back on the yoke shaft and opens the doors. The required pressure is applied automatically at the proper time in the operations cycle, which is to be more fully described later, by means of a pin 366 mounted on a hinged plate 368 connected to rotate with a drive shaft 370 from which the cup support arm 358 is also driven. As the pin is swung in an arc by rotation of the drive shaft 370 and the hinged plate, the hinged plate rides up over a fixed cam 372, mounted on a non-rotatable housing 374 for the drive shaft 370, raising the pin to a level such that it strikes the inner end of the lever arm 360, pushing the end forward. Rotation of the shaft 370 and the hinged plate in the opposite direction swings the pin 366 away from the lever arm and permits the biasing spring 354 to move shaft 352 forward, closing the doors of the cup.

The compound cup is swung in an arc back and forth between the compound extruder and the molding platens by its support arm. The cup support arm is connected to a sleeve 376, mounted on the upper end of drive shaft 370 so as to be slidably rotated thereon. The lower part of the sleeve is provided with a circumferentially extending slot 378, adapted to accommodate a drive pin 380 mounted on the drive shaft 370. When the drive shaft turns in a clockwise direction, the pin strikes one end of the slot, thus rotating the sleeve and swinging the compound cup in a clockwise arc toward the extruder.

Rotation of the drive shaft clockwise does not carry the cup beneath the extrusion orifice, however. Instead, the shaft stops rotating at a predetermined position and leaves the cup in a normal rest position adjacent the extruder but not beneath it. Additional means is provided for moving the compound loader cup beneath the extrusion orifice. Referring to Figure 24, this means comprises an air cylinder 382 having a piston 384 to one end of which is connected a pusher bar 386.

The operation of the above described means is as follows: Water is admitted to the upper end of the hydraulic extrusion cylinder 264 through 3-way valve 282 operated by air from the air line 286 connected to the air supply through the 4-way valve 288. This air line also has a branch 388 leading to one end of the air cylinder 382. When air enters the line 286 for opening the valve 282 controlling the movement of the piston in the hydraulic cylinder 264, air, at the same time, is admitted through the branch line 388 to the air cylinder 382. The cylinder 382 is mounted on the extruder frame above the compound loader arm 358. The piston 384 of the air cylinder moves outward and the downwardly protruding pusher bar 386 engages a lug 390 mounted on the upper surface of cup support arm 358. The plunger thus pushes the arm and the compound cup a short distance further in the clockwise arc, placing the cup under the extrusion orifice where it receives a charge of molding compound.

Referring to Figure 1, the bottom cross member 268 of the hydraulic piston 266 carries a valve tripper 392. At the end of the extrusion stroke, this valve tripper strikes the plunger of the valve 302 which lets air into the opposite end of the air cylinder 382 through a branch line 301 and moves the plunger 384 such that the pusher bar 386 is pulled away from the lug 390. This permits the cup support arm to be pulled back to its rest position by a spring 394 (see Figures 21 and 24) having one end connected to the cup support arm and the other end connected to another arm 396 connected to the drive shaft 370 so as to rotate therewith. The cylinder 382 and plunger 384 are so mounted that the lug 390 clears the end of the pusher bar 386 as the arm 358 moves in a counterclockwise direction. The same valve 302 which initiates the withdrawing of the plunger 384 also has an air line connection 300 leading to another air valve 296 which controls the water supply to the other end of the hydraulic cylinder 264. Opening of the valve 302 thus causes operation of the hydraulic piston raising the extrusion plunger.

When the pusher bar 386 disengages the lug 390, the cup 312 is swung in a counterclockwise arc by the contracting force of the spring 394, until it reaches a rest position. Travel of the cup and the support arm in this direction continues due to counterclockwise rotation of drive shaft 370 until the arm strikes one of the lower platen guide posts 42 which acts as a stop and is located such that the cup is directly over the center of the lower mold 86 when its motion is halted. The drive shaft 370 continues to rotate through a small angle, however, so that the pin 366 continues moving forward against the lever arm 360 as previously described.

Referring to Figure 25, the drive shaft 370 is driven from the main cam drive shaft 222 by means of a cam 398 having a track 400 which moves a cam follower 402 back and forth. The cam follower is attached to a rack 404 in mesh with a pinion gear 406 connected to the bottom of the drive shaft 370.

A particular feature of the compound loader, which is desirable, although not absolutely necessary, when molding phonograph records, is the means provided for forming a depression in the bottom of the plastic gob. Referring now to Figure 26, this means comprises a plunger 408, having a forming pin 410 of somewhat larger diameter than the mold spindle, projecting a short distance from its upper surface. The plunger is mounted for vertical sliding movement within a cylinder 412 mounted on the base plate 414 of the compound extruder.

The plunger 408 is moved up and down in the cylinder 412 by means of a first class lever arm 416 having a fulcrum support 418 near its mid-point. One end of the arm 416 is pivotally connected to the plunger. Force is applied to the other end of the lever arm by means of a vertically extending shaft 420, connected at its upper end through a bracket 422 to the upper cross-bar member 274 which connects the extrusion plunger 256 and the connecting rods 270 and 272 which are driven by the hydraulic cylinder piston 266. Since the stroke of the shaft 420 is much longer than is needed to operate the lever arm 416, means is included for permitting the shaft to continue its stroke after the force arm portion of the lever has reached the downward end of its movement. Thus, the shaft is provided with a long vertical slot 424 into which the lever 416 extends. A coil spring 426 is mounted on the shaft. The upper end of this spring is seated against a collar 428 fixed to the shaft with a set screw. The lower end of the spring is provided with a collar 430 which can slide on the shaft. When the extrusion plunger is caused to move downward to begin extruding a gob of molding compound into the cup 312, positioned beneath the extrusion orifice, the shaft 420 also moves downward and the collar 430 bears against the end of the lever 416 riding in the slot 424 pushing this end downward. The plunger 408 is moved upward by the lever until the forming pin 410 is pushed up through the opening 326 in the bottom of the cup doors 320 and 322. As the plastic material 432 is extruded into the cup, it builds up in a gob 434 around the forming pin. On the upstroke of the extrusion plunger, the shaft 420 also moves upward. The bottom of the slot 424 catches the end of the lever arm, pulling it upward and causing the plunger 408 to drop downward. This leaves a depression in the bottom of the cooling gob.

*Molded article remover*

Another feature of the apparatus of the present invention is the means for automatically removing each molded article 435 from the molding platens and for carrying the article to one or more finishing stations, if finishing steps are required. Where no further finishing operations are desired, this part of the apparatus can be used merely for removing each molded article from the press and carrying it to a position remote from the press. Referring particularly to Figures 28-31, the article remover comprises a carriage 436 mounted for reciprocating horizontal movement on a pair of tubular tracks 438 and 438', the tracks being disposed in parallel relation on either side of the lower press platen. The apparatus for moving the carriage back and forth along the tracks comprises a rack 440 connected to the underside of the carriage, a large diameter pinion gear 442 in mesh with this rack, and means for rotating this gear in opposite directions in accordance with a predetermined timed cycle. Referring additionally to Figures 32-34, this rotating means comprises a vertically disposed rack 444 mounted to slide within a guideway 446, and in mesh with a small pinion gear 448 mounted on the same axle as the large gear 442. A roller cam follower 450 on the bottom end of the rack 444 is moved back and forth vertically by a cooperating cam track 452 on a cam 453 mounted to rotate on the main cam drive shaft 222.

The article remover carriage is provided with two arms 454 and 454', disposed in parallel relationship and extending forwardly above the tracks 438 and 438', respectively. When the press platens are closed, these arms are outside the platens. Near the forward end of each of the arms 454 and 454' is mounted a pair of gripping fingers 456 and 456'. These pairs of fingers extend transversely with respect to the arms and also extend toward each other. Each pair of fingers is biased to a normally closed position by a spring 458 or 458'. The fingers are adapted to grip the edge of flashing 460 which flows out between the molds 84 and 86 of the press when the platens are closed and engaged in a molding operation.

Means are provided for opening and closing each pair of fingers automatically at predetermined points in the operations cycle. The lower finger of each pair is provided with an opening 462, as seen more clearly in Figures 30 and 31. The rim of the lower mold platen is provided with two upwardly extending pins 464 disposed on opposite sides of the platen such that they will pass through the openings 462 and push the upper finger of each pair of fingers upward, thus separating the upper and lower fingers, when the lower press platen is in its closed position. At this time, the carriage must be at its normal rest position at the molding station; that is, at the right hand end of the tracks as seen in the drawing. When the lower press platen is lowered to its open position, the pins are withdrawn from the openings in the lower fingers and the fingers are closed by their biasing springs.

When the press platens are opened, the article remover carriage is driven along its tracks. It may be made to dwell at one or more points along its path before arriving at the final finishing station. Referring first to Figures 1 or 17 for an overall view and then to Figures 35 to 39 for detail views of apparatus comprising the finishing stations, in the particular form of apparatus illustrated; that is, a phonograph record press, the carriage is made to dwell at a first finishing station where a large center hole opening 466 is formed by punching a slug out of the label area of the record. This slug is punched out by a punch press 468 having an upper punching die 470 and a lower punching die 472 having a center opening 474. The punched-out slug drops through the opening 474 in the lower die. The punch press is actuated by an air cylinder 476. Air to the upper end of this cylinder is supplied through a branch air line 478 connected to one side of a 4-way valve 480. This valve receives air from the main air supply line through a branch 481. Air through valve 480 to line 478 is controlled by air under 80 lb./sq. inch pressure, in air line 482. This line is opened and closed by means of a poppet valve 484 which is operated by a cam 490 on the main camshaft. The lower end of the air cylinder 476 is supplied with air under pressure through a line 486 connected to the other side of the 4-way valve 480. This side of the valve is supplied constantly with air under 40 lb./sq. inch pressure through a line 488 taken off the line 306 which is connected to the main air supply line 30 through a branch line 536.

Referring to Figures 37 and 38, the structure of suitable punching dies is shown in more detail. These figures, incidentally, show two sets of center punching dies such as would be used in a dual press set-up. One set of these dies would be omitted for a single press assembly. The upper punching die 470 includes a sleeve member 471 adapted for limited sliding vertical movement over the external walls of the die. This sleeve is cushioned against the bed plate 473 by means of a spring 475. The cam track 452 is provided with a suitable dwell for stopping the carriage 436 at a point such that the phonograph record is centered with respect to the die punches, long enough for the punch press to operate.

The second finishing station comprises another set of dies on the same punch press as used for the set of punching dies previously described. This second set consists of an upper die 492 and a lower die 494 of relatively large diameters which cooperate to trim off the outer flashing 460 of the record 435. The lower die has a center opening 496 to permit the finished record to drop down upon a spindle 498. The punch press is operated, for the purpose of trimming off the outer flashing, by a lobe of the cam 490. This lobe operates the same valve 484 previously referred to.

*Flash remover*

A particular feature of the present invention is the means for automatically disposing of the flashing trimmed off each molded article. This means comprises means for stripping the flashing from the trimming dies and means for engaging and tossing the flashing to one side.

The means for stripping the flashing from the trimming dies comprises a stripping sleeve 500 mounted slidably around the outer periphery of the upper punching die 492. The stripping sleeve is biased to a normal rest position at which it protrudes slightly lower than the cutting edge of the die, by springs 502 seated against the bed plate 473 of the upper dies. When the upper die moves downward and engages the lower die 494, trimming off the flashing 460, the stripping sleeve is forced upward against the pressure of the biasing springs 502. When the upper die is retracted again, the stripping sleeve is pressed downward by the springs, thus stripping the flashing from the upper die.

After the dies have separated subsequent to the flash trimming operation, the flashing is still gripped between the gripping fingers 456 and 456'. Rotation of the cam track 452 results in downward movement of the rack 444 and movement of the carriage 436 back toward the molding platens. Positioned between the center punching dies and the molding platens is a means for engaging the flashing ring and tossing it to one side. This means comprises an arm 504 extending outward from a rotatable shaft 506 which is mounted in bearings 508 fixed to the bed plate 473 of the punching dies. The normal rest position of the arm 504 is substantially horizontal.

Rotation of the shaft 506 in a direction such that the arm 504 extends downwardly is accomplished by a solenoid 510 having a plunger 512. One end of the rotatable shaft 506 is provided with a crank 514 having a slot 516 in its upper end. The plunger 512 is provided with two outwardly extending arms 518 having downwardly extending portions. These last mentioned portions are pivotally connected to the crank by means of a pin 520 extending through the slot 516. When the solenoid is energized, the plunger 512 is drawn inward, the shaft 506 is rotated in one direction, and the arm 504 is swung to its downwardly extending position.

The shaft 506 is rotated in the opposite direction by a pair of biasing springs 522, one end of each of which is connected to one of the arms 518 and the other end of which is fixed to a bracket 524 mounted on the bed plate 473 of the punching dies.

The solenoid 510 is actuated by a switch 526 turned on and off by means of a cam 528 mounted on the main cam drive shaft. At a predetermined point in the operations cycle of the apparatus, the rotating cam closes this switch 526 and pulls the plunger 512 into the solenoid. The shaft rotates, causing the arm 504 to swing in an arc downward such that the end of the arm is lower than the flashing. The flashing is carried by the movement of the carriage such that it passes beneath the remover arm. The arm has a deflecting plate 530 which engages the flashing and directs it downward. The arm also has a hook 532 on its lower end which engages the flashing while the arm is performing an upward swinging motion. The upward motion of the arm is started when the cam 528 releases the switch 526 controlling the operation of solenoid 510. This permits the springs 522 to rotate the shaft 506 and to swing the arm 504 upward. At the end of the swinging motion of the arm, the flashing ring is tossed free from the hook and falls to one side.

The cam track 452 which controls the movements of the record remover carriage is provided with a segment to drive the carriage from the first finishing station to the second finishing station, another segment to provide a dwell for the carriage at this station, and still another segment to pull the carriage back between the press platens.

*Operation cycle*

A complete operations cycle of the apparatus above described will now be given.

Referring first to Fig. 3, the heart of the system for automatically controlling all of the press operations is the timer 35 of conventional type. The timer may comprise a drum carrying a series of parallel grooves having cam segments fixed thereon of predetermined and varying length. Upon the cam segments of each track rides a cam follower connected to a shaft carrying a valve closure member. As the drum rotates, driven by an electric motor, the cam followers are raised and lowered in a predetermined sequence, thus opening or closing corresponding valves opening into an air manifold. Air to the timer is supplied from an air inlet line 536 after passing through a pressure regulating valve in the air supply line 30.

Assuming that the timer has previously been set in motion by the operator and that the pressing portion of the cycle has begun and is nearing conclusion, the parts of the apparatus will be in the positions shown in Figures 1 and 2. As shown in these figures, the upper and lower molding platens 4 and 6 are in their closed positions, the upper platen being locked in place and the hydraulic ram 46 being in its "up" position.

When the hydraulic ram is in the "up" position, valve No. 4 in the timer is open, thus supplying air under 40 pounds pressure through air line 56 to the diaphragm of 3-way valve 54, which action opens a passage through this valve permitting water under high pressure in hydraulic supply line 52 to enter the press ram supply line 50.

Since the pressing portion of the cycle is nearly ended, steam control valve No. 1 on the timer is closed and water control valve No. 2 is open. In open condition, timer valve No. 2 puts air under 40 pounds pressure in line 95 on the diaphragm of 2-way valve 93, thus opening a passage in this valve permitting cold water from water supply line 91 to enter the press molding platens 4 and 6 via flexible branch lines 89. Cold water circulating in the molds is for the purpose of chilling the molded product, thus permitting it to harden and shrink away from the molds somewhat so that it can be removed easily.

As shown in Figure 2, valve tripping bar 120 is in its "up" position, due to the lower platen being in its closed position. With reference to the detail drawing of Figure 7, the tripping bar exerts pressure through the roller 132 on pivoted lever 130 to the button on the plunger 128 of air valve 118, pressing the stem inwardly against the biasing force of the spring and opening the air ports 124 and 126 in this valve. With this valve open, compressed air from the supply line 30 flows through the valve inlet line 115 to the valve outlet line 116, thence through the branches 206 and 114 of the outlet line to the lower label stack cylinder 186 (see Figures 13 and 14) and the upper label stack cylinder 112 (see Figures 5 and 6). Air pressure on the label stack cylinders forces their respective pistons upwardly, thus pressing the label stacks against the vacuum pick-up cups 208 and 134.

Meanwhile, the vacuum lines to the pick-up cups are open, applying suction to the cups and causing each cup to pick up the top label from its associated stack. The vacuum lines are opened by solenoid valves 176 and 218 in the vacuum lines to the upper and lower label pick-up cups, respectively. These valves are normally open when the upper platen of the press is in its closed position.

As shown in Figures 1 and 2, the article remover carriage 436 is in position between the press platens ready to receive an article at the conclusion of the molding portion of the cycle. In this position, the carriage is at the right hand end of the tracks 438 and 438' and the gripping fingers 456 and 456' are biased to their open position (see Figure 30) by the pins 464. Flashing 460 from the article being molded has flowed out between the fingers.

During this portion of the cycle, the compound loader cup 312 is in position beneath the extrusion orifice 258 of the molding compound extrusion cylinder 254, being held there by the extended position of pusher bar 386 connected to the piston 384 of air cylinder 382. The cup is moved to this position by an impulse of air, received by the opening of timer valve No. 5, to the air line 292 connected to 4-way valve 288. From this valve the air passes to the cup shifter air cylinder 382 (left hand end as seen in Fig. 3) pushing the piston of this cylinder outwardly.

At the same time as the cup is shifted beneath the extrusion nozzle, air from another branch line 286, connected to the 4-way valve 288, is applied to the diaphragm of 3-way valve 282, thus opening a passage through this valve and permitting water under pressure from the hydraulic supply line 52 to be applied to the line 280 connected to the upper end of the hydraulic cylinder 264 which operates the extrusion plunger 256.

The hopper 262 of the extrusion cylinder will have previously been filled with granulated molding composition and a portion of this automatically flows into the empty extrusion cylinder each time the extrusion plunger 256 is raised to its "up" position, as seen, for example, in Figure 1. The composition is heated in the extrusion cylinder to a temperature sufficient to render it plastic to the desired degree. The particular heating temperature used depends, of course, on the molding composition being used.

With application of water under pressure to the upper end of the hydraulic cylinder 264, as above described, the extrusion plunger is forced downward and a measured quantity of molding composition is extruded into the cup 312. The cup will be in the position shown in detail in Figure 26 with the forming pin 410 being in its "up" position projecting through the bottom opening 326 of the cup.

As shown in Figures 26 and 26a, when the extrusion plunger is in the raised position, the shaft 420 (Figure 26a) is also raised and the forming pin piston 408 is resting at the bottom of the cylinder 412. When the extrusion plunger moves downward, the shaft 420 also travels downward and the collar 430 presses downward on one end of the pivoted lever 416 raising the piston 408 and forming pin 410 upward to the position shown in Figure 26. The shaft 420 continues to travel downward a certain further distance which causes one end of the lever 416 to ride upward in the slot 424 provided for this purpose. Meanwhile, the spring 426 maintains pressure on the lever.

As the extrusion plunger reaches the lower limit of its stroke, the tripping member 392 connected to the lower cross member 268 beneath the hydraulic cylinder 264 opens a poppet valve 302, thus reversing the air flow in 4-way valve 288. This action causes the diaphragm of 3-way valve 282 to return to its normal rest position and closes the water passage between the hydraulic line and the left hand end of the hydraulic cylinder (as seen in Figure 3). At the same time, air pressure is put on the diaphragm of 3-way valve 296 through an air line 300, opening a water passage through this valve between the hydraulic water line 52 and a line 294 supplying the lower end of the hydraulic cylinder 264. This forces the piston 266 of the hydraulic cylinder upward and also moves the extrusion plunger back to its "up" position. Also, at the same time, air from a branch line 301 taken off air line 300 leading to the diaphragm of 3-way valve 296 is applied to the right hand end (as seen in Figure 3) of compound loader cup shifting cylinder 382, withdrawing its piston and the pusher bar from contact with the compound cup loader arm 358. The loader arm being spring-loaded, the cup is pulled out to a rest position to one side of the extruder nozzle (see Fig. 17) to await the opening of the press platens.

When the extruder plunger moves upward, the forming pin 410 drops down to its rest position, the lever 416 having been released due to upward movement of the shaft 420.

During the latter part of the molding cycle, the water which has been circulated in the platens is discharged into the drain 62. To accomplish this, valve No. 3 on the timer opens, putting air pressure on the diaphragm of a 3-way valve 538 through an air line 540, opening a passage between outlet line 542 from the platens to the water drain line 544.

During the portion of the operations cycle which has been described up to this point, the main cam drive shaft remains stationary.

The length of the molding cycle is controlled by setting the timer, since this portion of the complete operations cycle will vary in length of time depending upon the molding composition used.

At the end of the molding cycle, timer valve No. 4 closes, taking air pressure off the diaphragm of 3-way valve 54 and releasing the hydraulic pressure to the press ram 46. Water drains from the cylinder of the ram through the valve to the drain line 60 and thence to the drain.

Upon release of the hydraulic pressure from the ram, the ram and the lower press platen both move downward aided by force exerted by the heavy coil springs 58. Movement of the lower platen downward withdraws pins 464 which have been biasing the flash gripping fingers 456 and 456' to open position. These fingers are thus permitted to close on the flashing (see Figure 31).

Also, when the lower press platen moves downward, valve tripper member 120 also moves downward, disengaging roller 132, removing pressure from the valve button and permitting valve 118 to be closed by spring pressure. This releases air pressure from the air cylinders of the label stack holders and the stack holders move downward, leaving the top label of each stack held on the face of its associated pick-up cup.

Movement of the lower platen downward also causes another valve tripping member 83 to engage roller 85, mounted on lever 87, which, in turn, presses against the button of a valve 36, opening an air passage through this valve. Meanwhile valve No. 7 of the timer is closed and valve No. 6 is open, permitting air to flow from an air line 34 of the timer through the valve 36 to the 4-way valve 32. This action causes air from the supply line 30 to flow through branch line 33 to the 4-way valve 32 and out of this valve via branch line 552 to a T having one branch 80 leading to the lower end of air cylinder 72 operating the locking pin mechanism of the upper platen, and another branch 26 leading through a speed reducer 554 to the upper end of the upper platen air cylinder 24. When the compressed air enters the locking pin cylinder through the line 80, the locking pins are withdrawn from their keyways by action of the locking pin cylinder piston. Air delayed by the reducer 554 then pulls the piston within the upper platen cylinder downward, causing the upper platen of the press to swing open with the aid of the heavy counterweight 18.

With particular reference to Figures 4 and 40, and to detail drawings of Figures 11 and 12, as the upper platen swings open, the upper label loading arm 136 swings through an arc into the press and places the label, being held on the face of the vacuum cup, such that the center hole of the label slips over the center pin of the upper mold. As the platen opens, the cam follower 166 attached to the rear of rack 160 rides in the cam-track 168, causing the rack to be pushed forward and thus rotate the pinion gear 164 in a counterclockwise direction. This gear drives the axle 156 to which the label loader arm is connected and hence this arm is also rotated in a counterclockwise arc.

As the upper platen reaches its open position, a lever 174 strikes microswitch 172, closing solenoid valve 176, closing off the vacuum line 150 to the label pick-up cup 134. Vacuum to the cup is cut off just as the label is slipped over the center pin of the mold, releasing the label and permitting it to be held frictionally on the pin.

Also, as the upper platen reaches its open position, it strikes another microswitch 556 which, in turn, energizes a solenoid starting the main cam shaft drive motor 558. A microswitch 560, connected in parallel with microswitch 556, is closed by rotation of article remover cam 453. The camshaft motor will run until the button actuating this microswitch falls into a notch on this cam.

With reference first to Figure 17, rotation of the main camshaft 222 causes rotation of a number of cams which control the operation of various parts of the apparatus, as will now be described.

Now referring to Figure 32, the record remover cam 453 rotates, causing cam follower 450 to move vertically. Since cam follower 450 is connected to rack 444, this rack also moves vertically and drives pinion gear 448 which is mounted on the same axle as large toothed driving gear 442. Both of these gears are caused to rotate in a counterclockwise direction, thus causing rack 440 to move toward the left and moving the article remover carriage toward the left, also. The article remover carriage, with the article (in this case a phonograph record) suspended between the gripping fingers, is carried to the first trimming station. A dwell in the cam track 452 causes the carriage to pause long enough at this point for the center hole to be punched out of the record.

Cam 490, which controls the operation of the punch press 468, rotates with the main camshaft and opens poppet valve 484, sending air under 80 lb./sq. inch pressure from the air supply line 30 to one end of 4-way valve 480. A passage is thus opened through this valve and through the line 478 to the top of the air cylinder 476, the piston of which operates the punch press. The piston of this air cylinder is forced downward and pressure is transmitted through the linking members to the bed plate 473, carrying both the large upper die 492 and the small upper die 470. Both dies move downward but, since the record is positioned beneath the small die at this time, only the center hole slug is punched out. The punched out slug drops through the center opening 474 in the bottom die member 472.

As the cam 490 continues to rotate, it releases the plunger of the poppet valve 484, closing the valve and thus shutting off the 80 lb. air in the line 482. The 40 lb. air pressure in the line 488 then operates valve 480 and opens a passage through this valve between air lines 481 and 486. Air from the line 486 enters the lower end of cylinder 476, causing the piston to be forced upward, thus raising the dies.

Referring to Figure 41, while the record remover carriage is travelling to the punching apparatus as above described, the lower label loader device goes through the operations of placing a label on the lower record mold. Motions of this device are controlled by rotation of cams mounted on the main camshaft. As the cam 240 rotates, it strikes one end of the pawl 242, thus pressing this end down and raising the opposite end. The opposite end pushes the shaft 220 upward, raising the vacuum cup 208 from the lower label stack.

Next, the cam follower 228, riding in cam track 226, pulls the rack 230 in a forward direction (or to the left as seen in Figure 16). The movement of the rack causes rotation of the pinion gear 234 meshed therewith and swings the horizontal label loader arm 210 and the vacuum cup 208, with label attached, in an arc so that, at the end of the swing, the vacuum cup is centered over the center pin of the lower mold 86.

Referring to Figure 15, as the center slug is being punched out of the record, further rotation of the cam 240 releases the pawl 242 and the lower label loader shaft 220 drops downward, pulled by the biasing force of spring 246. This action causes the vacuum cup 208 to drop downward, placing its label on the face of the lower mold and centered on the mold pin. As the shaft 220 drops downward, the pin 250 connected to the collar 244, which is, in turn, connected to the shaft 220 of the lower label loader, drops downward also and trips the microswitch 252. This microswitch closes the solenoid valve 218, cutting off the suction in line 216 to the vacuum cup 208 and the cup releases the label.

While the label is being placed on the lower mold, the record remover carriage is moved to the next trimming station by further rotation of the cam 453, finally taking the position shown in Figure 42. Another dwell in the cam track 452 holds the carriage stationary while the trimming operations are carried out. When the record is positioned, the cam 490 once again opens the poppet valve 484 supplying air to the upper end of the cylinder 476 of the punch press. The press operates in the same manner as previously described but this time the large diameter dies 492 and 494 trim the flashing from the record (see Figure 39). The dies are then retracted to their "up" position just as previously described.

The finished record 562 drops down through the center opening 496 of the lower die 494 and falls onto the spindle 498.

While the record remover carriage is moving to the second trimming station, the shaft 220 of the lower label loader is again lifted by cam action, just as previously described, and movement of the cam follower 228 in a direction opposite to that previously mentioned pulls the rack 230 in an inward direction and causes rotation of the loader arm and vacuum cup so that these members swing horizontally outward from between the press platens. The end of the swing places the vacuum cup 208 over the lower label stack and the cam 240 again releases the pawl 242 so that the cup drops down over the spindle pin of the stack to its original starting position.

While the lower label loader arm is swinging out from between the platens, the compound loader arm 358 is swinging into the press. Rotation of the cam track 400 with the cam 398 on the main camshaft causes cam follower 402 to move horizontally forward and pull the rack 404 in this direction, also. As the rack moves forward, it rotates pinion gear 406, which causes rotation of the compound loader shaft 370 in a direction to swing the compound cup 312 toward the press platens. Movement of the cup and the arm 358 continues until the cup is directly over the center of the lower mold 86 at the position shown in Figure 42.

The loader arm comes to a positive stop but the shaft 370 continues to rotate, causing further rotation of the pin 366 mounted on hinged plate 368. As shown in Figure 21, the hinged plate rides up over the fixed cam 372 raising the pin so that it strikes the inner end of the lever arm 360 which opens the doors 320 and 322 on the bottom of the compound cup. Pressure of the pin on the lever arm moves this arm forward and pulls the yoke shaft 352 backward, thus pulling open the compound cup doors. When the compound cup doors open, the gob of molding composition drops down upon the lower mold 86 over the label which was previously deposited. The depression formed in the bottom of the gob, as previously described, receives the centering pin of the mold and holds the gob in proper position.

Reversal of movement of the cam follower 402 due to continued rotation of the cam 398 results in reversal of rotation of the compound loader shaft 370 and swinging of the compound loader arm and cup out of the press. As the arm swings outward, the hinged plate 368 with its pin drops downward out of the path of the lever arm 360 and the force of the spring 354 closes the doors in the cup. The compound loader arm comes to a rest position with the cup positioned to one side of the extrusion orifice 258.

Next, the article remover carriage starts back from the second trimming station, still being driven, of course, by continued rotation of cam 453. The record flashing 460 still remains gripped in the gripping fingers, as shown in Figure 35. At the same time as the fingers gripping the flashing are passing the end of the bed plate 473 carrying the upper punch dies, the cam 528 on the main driveshaft operates microswitch 526, energizing solenoid 510, thus rotating shaft 506 and also rotating the flash remover arm 504 to its downwardly vertical position.

The article remover carriage continues to move back toward the press, as shown in Figure 36. One edge of the flashing is engaged by the flashing remover arm and the flashing is pulled loose from the gripping fingers 456 and 456'.

Continued rotation of the cam 528 releases the microswitch 526, deenergizing the solenoid 510 and causing the flashing remover arm 504 to swing back up to its horizontal rest position. As the arm swings upward, the flashing ring is tossed to one side off the hook 532.

Meanwhile, the article remover carriage has continued its travel until it is back between the platens in its original position.

The cam 41 rotating on the main camshaft now opens the poppet valve 39 allowing air to flow through the open air valve No. 7 on the timer through air line 37 to the 4-way valve 32, allowing air to flow through this valve to air line 566 having one branch 28 leading to the lower end of the upper platen air cylinder 24 and another branch leading to the upper end of the locking pin air cylinder 72. Air first enters the lower end of the upper platen air cylinder, forcing its piston upward and causing the upper platen to swing downward to its closed position.

When the upper platen is completely closed, a poppet valve 82 mounted on the rear of the press frame above the arm 20, from which the counterbalance is hung, is opened and air enters the upper end of the locking pin cylinder 72 causing the bolts 70 to be shot home in their keyways. Movement of one of these bolts into its keyway trips a microswitch 568 which starts the timer motor (not shown).

The camshaft having now made one complete rotation, the cam 453 releases switch 560 stopping the camshaft drive motor.

The timer opens its valve No. 4 putting air on the diaphragm of 3-way valve 54, permitting water from the hydraulic line 52 to flow through this valve and force the press ram 46 upward to its closed position. As the ram moves upward, valve 118 is closed by the lever 120 and the apparatus is now in the same condition as at the beginning of the cycle.

There has thus been described one embodiment of automatic molding apparatus which is illustrative of the various aspects of the present invention. It will be obvious to those skilled in the art that various substitutions for parts of the apparatus may be made without departing from the scope of the invention. It will also be apparent that certain portions of the apparatus may be used separately and that almost any combination of these portions may be used without utilizing the entire apparatus disclosed. For example, the labelling portions of the apparatus may be used with any form of compound loader or with manual loading, or the article remover may be used with or without any one or more of the compound loader, upper label loader, and lower label loader.

Notwithstanding the fact that various portions of the apparatus may be used separately, the entire apparatus can also be used as a unit, as has been fully described, since each part performs its function in response to the previous action of another part.

We claim as our invention:

1. A phonograph record manufacturing apparatus comprising a pair of molding platens having an open and a closed position, means responsive to the opening of said platens for positioning a record label on one of said platens, a cycle control cam shaft, means responsive to the opening of said platens for actuating said cam shaft, means actuated by said cam shaft for positioning a record label on the other of said platens, means actuated by said cam shaft for applying a quantity of moldable material between said platens after said labels have been positioned, means actuated by said cam shaft for closing said platens after application of said moldable material, means responsive to the closing of said platens for performing a timed cycle of heating and cooling operations on said material while said platens are closed, means responsive to said time cycle means for opening said platens, means actuated by said cam shaft for removing the molded record from between said platens and for transferring the record to a finishing station, and means actuated by said cam shaft for performing finishing operations on said record.

2. In an apparatus for molding plastic materials, a set of molding platens having an open and a closed position, means for closing and opening said platens, means for preheating said plastic material, a cycle control cam shaft, means responsive to the opening of said platens for actuating said cam shaft, a transfer arm for transferring said material from said preheating means to said platens, said transfer arm including a receptacle for receiving said material, means for extruding individual charges of said preheated material into said receptacle, means actuated by said cam shaft for moving said receptacle between said preheating means and a position between said platens, and means responsive to the arrival of said receptacle at said last mentioned position for discharging said charge from said receptacle.

3. In a molding apparatus, a pair of molding platens, one of which always remains in a substantially horizontal position, means for opening and closing said platens, a pin located centrally on said horizontally positioned platen, means for preheating successive charges of particulate plastics material, means for extruding said charges separately in the form of cohesive masses, a receptacle for receiving each of said masses while it is still in a softened condition, means responsive to operation of said extruding means for forming a depression in each of said masses as it is being received in said receptacle, and means responsive to the opening of said platens for depositing each of said masses on said horizontally positioned platen such that said depression is complementary to said pin.

4. In a plastics molding apparatus, a molding station including a pair of molding platens, means for opening and closing said platens, means for preheating a charge of plastics molding material, a transfer means, means for extruding said charge into said transfer means, means responsive to operation of said extruding means for moving said transfer means from said extruding means to a position intermediate said extruding means and said molding station, and means responsive to opening of said platens for carrying said transfer means from said intermediate position to said molding station, said transfer means including a cup having a bottom constituted of a pair of leaves having an open and a closed position and means rendered operative upon the arrival of said cup at said molding station for depositing said charge onto one of said platens wherein said depositing means includes means for moving said leaves to said open position.

5. In a molding apparatus including an upper and a lower molding platen and means for opening and closing said platens, apparatus for placing a label on said upper platen when said platens are in open position, said label-placing apparatus comprising means for holding a stack of said labels, a pneumatic pick-up device pivotally mounted on said upper platen, means responsive to the opening and closing of said platens for pivotally moving said device in position to pick up a label from said stack when said platens are in closed position and for placing said label on said upper platen when said platens are in open position.

6. Apparatus according to claim 5 including means for applying suction to said device when said device is in position to pick up a label from said stack and for releasing said suction when said device is in position to place said label on said upper platen.

7. Apparatus according to claim 6 including means operative in response to the closing of said platens for urging the top label of said label stack into contact with said pick-up device when said device is in said pick-up position.

8. A molding apparatus comprising, in combination, a pair of molding platens, one of which is mounted for pivotal movement between an open and a closed position and the other of which is mounted for vertical movement between an open and a closed position, means for opening and closing said platens, means for holding a stack of labels, a pneumatic pick-up device for picking up a label from a stack of labels on said holding means, means responsive to movement of said vertically movable platen to its closed position for urging the labels in said holding means against said pick-up device, and means responsive to the opening of said pivotally mounted platen for moving said pick-up device thereto and depositing a label thereon.

9. In a molding apparatus including a pair of molding platens, one of which is mounted for pivotal movement between an open and a closed position, a suction head for holding a label, means responsive to the movement of said platen toward said open position for moving said head between a label pick-up position and a position for depositing said label on said platen and a centering device on said platen adapted to frictionally engage a centering hole in each of said labels.

10. Apparatus according to claim 9 in which said means for moving said suction head includes an arm having an end pivotally mounted on said platen.

11. Apparatus according to claim 10 including a shaft connected to said pivotally mounted end and rotatably mounted on said platen, a pinion gear in driving relationship to said shaft, a rack in driving relationship to said gear, and means for imparting reciprocal motion to said rack, said last mentioned means comprising a fixed cam track and a cam mounted on said pivotally mounted platen.

12. A molding apparatus comprising, in combination, an upper and a lower molding platen, means for opening and closing said platens, means responsive to opening of said platens for depositing a label on at least the lower one of said platens, means for extruding a charge of moldable material into a receiving means while said platens are in closed position, and means for transferring said charge of material from said receiving means to said lower platen after said label has been deposited thereon.

13. In a molding apparatus including a set of molding platens, having an open and a closed position, for exerting molding pressure on a charge of moldable material positioned between said platens such that a part of said charge exudes from between said platens to form a flashing upon closure of said platens, two pairs of jaws disposed in diametrically opposed positions with respect to said platens when said platens are in said closed position, means biasing said jaws in normally closed position, means responsive to closing of said platens for opening said jaws to permit a part of said flashing to flow therebetween as it exudes, means responsive to the opening of said platens for moving said jaws, as they grip a molded article, to a position remote from said platens and for returning said jaws to their original position, and means for removing said article from said jaws at said remote position.

14. In a molding apparatus of the type comprising a set of molding platens adapted to compress a charge of moldable material therebetween and from which a portion of said charge may exude to form a flashing which remains attached to the article being molded after the molding cycle is complete, and means for opening and closing said platens, means operative in response to opening of said platens for gripping said flashing, means for moving said gripping means and the article carried thereby to a trimming station, means disposed at said trimming station for trimming said flashing from said article, and means for releasing said gripping means from said flashing.

15. Apparatus according to claim 14 in which said trimming means is a punch and die apparatus.

16. In a molding apparatus of the type adapted to mold an article such that a flashing remains on the article at the end of the molding step, means for gripping said flashing and for carrying said article to a finishing station, means located at said station for trimming said flashing from said article in a manner such that the flashing remains in said gripping means, and means responsive to movement of said gripping means for freeing said flashing therefrom.

References Cited in the file of this patent

UNITED STATES PATENTS

| | | |
|---|---|---|
| 1,206,034 | Sanders | Nov. 28, 1916 |
| 1,448,376 | Berger | Mar. 13, 1923 |
| 1,473,649 | Schlesinger | Nov. 13, 1923 |
| 1,706,874 | Journo | Mar. 26, 1929 |
| 1,731,834 | Wheeler | Oct. 15, 1929 |
| 1,982,576 | Derry | Nov. 27, 1934 |
| 2,088,377 | Kluge et al. | July 27, 1937 |
| 2,166,490 | Gora | July 18, 1939 |
| 2,275,561 | Sahlin | Mar. 10, 1942 |
| 2,375,252 | Sayre | May 8, 1945 |
| 2,377,392 | Wiley | June 5, 1945 |
| 2,409,725 | Witmore et al. | Oct. 22, 1946 |
| 2,414,621 | Von Hofe | Jan. 21, 1947 |
| 2,437,884 | Maynard | Mar. 16, 1948 |
| 2,467,440 | Meharg et al. | Apr. 19, 1949 |
| 2,499,602 | Miller | Mar. 7, 1950 |
| 2,508,301 | Stacy | May 16, 1950 |
| 2,518,850 | Akeroyd | Aug. 15, 1950 |
| 2,621,363 | Fienberg et al. | Dec. 16, 1952 |
| 2,642,621 | Amo | June 23, 1953 |

FOREIGN PATENTS

| | | |
|---|---|---|
| 358,601 | Great Britain | Oct. 15, 1931 |